United States Patent [19]

Brzezinski et al.

[11] Patent Number: 5,570,297
[45] Date of Patent: Oct. 29, 1996

[54] METHOD AND APPARATUS FOR SYNCHRONIZING DATA TRANSFER RATE FROM A CATHODE RAY TUBE VIDEO MONITOR TO A PORTABLE INFORMATION DEVICE

[75] Inventors: Philip S. Brzezinski, Middlebury; Thomas J. Dvorachek, Kensington, both of Conn.

[73] Assignee: Timex Corporation, Middlebury, Conn.

[21] Appl. No.: 251,224

[22] Filed: May 31, 1994

[51] Int. Cl.$^6$ .................................................. G06F 15/16
[52] U.S. Cl. ............................... 364/514 R; 364/705.07; 364/708.1
[58] Field of Search .......................... 364/514 R, 940.81, 364/937, 705.07, 708.1; 359/158; 345/207; 375/368, 374, 225; 340/825.2

[56] References Cited

U.S. PATENT DOCUMENTS

| | | | |
|---|---|---|---|
| Re. 32,282 | 11/1986 | Baer | 273/85 G |
| 3,513,447 | 5/1970 | Stone | 364/937 |
| 3,760,373 | 9/1973 | Bartz | 364/937 |
| 3,993,861 | 11/1976 | Baer | 358/146 |
| 4,130,738 | 12/1978 | Sandstedt | 179/90 B |
| 4,211,065 | 7/1980 | Schmitz et al. | 368/47 |
| 4,329,684 | 5/1982 | Monteath et al. | 340/707 |
| 4,403,869 | 9/1983 | Crutcher | 368/10 |
| 4,534,012 | 8/1985 | Yokozawa | 364/900 |
| 4,608,601 | 8/1986 | Shreck et al. | 358/146 |
| 4,613,904 | 9/1985 | Lurie | 358/142 |
| 4,663,766 | 5/1987 | Bremer | 375/225 |
| 4,999,617 | 3/1991 | Uemura et al. | 340/706 |
| 5,008,902 | 4/1991 | Key et al. | 375/225 |
| 5,095,498 | 3/1992 | DeLuca et al. | 375/94 |

FOREIGN PATENT DOCUMENTS

| | | |
|---|---|---|
| 59-205661 | 11/1984 | Japan . |
| 60-021477 | 2/1985 | Japan . |
| 2044446 | 1/1980 | United Kingdom . |
| 2079995 | 1/1982 | United Kingdom . |
| 2165129 | 4/1986 | United Kingdom . |
| 2165129B | 10/1988 | United Kingdom . |
| WO91/07011 | 5/1991 | WIPO . |

*Primary Examiner*—Ellis B. Ramirez
*Attorney, Agent, or Firm*—William C. Crutcher

[57] ABSTRACT

Method and apparatus for synchronizing the data transfer rate for downloading data from a cathode ray tube (CRT) adapted for transmission of serial data bits as light pulses appearing as spaced lines on the CRT to a portable information device having a photosensor which receives and stores binary coded data corresponding to the light pulses at a fixed pulse reception rate. The CRT displays a calibration pattern of spaced horizontal lines, which is transmitted to the portable information device where it is repetitively compared to a stored calibration character. An acceptable error free transmission is signaled by a preselected number of matches. An audible signal indicates that the transmission rate is acceptable. The CRT pattern line spacing is adjusted until the audible signal is heard. The selectable pulse repetition rate may be automatically changed in increments by periodically changing the separation between lines on the CRT until an audible output signal is heard and providing for an operator to halt the automatic process. Alternatively, the pulse repetition rate may be manually changed in increments by an operator, until an audible output signal is heard.

11 Claims, 17 Drawing Sheets

METHOD AND APPARATUS FOR SYNCHRONIZING DATA TRANSFER RATE FROM A CATHODE RAY TUBE VIDEO MONITOR TO A PORTABLE INFORMATION DEVICE

BACKGROUND OF THE INVENTION

This invention relates to transferring information or data from a data transmitter including a cathode ray tube (CRT), such as a computer having a CRT monitor, to a portable information device (e.g., a wrist instrument, such as a multi-function electronic wristwatch), and more particularly to synchronizing the rate of data transfer from transmitter to receiver.

The use of both computers and hand-sized, portable information devices continues to expand. Various methods have been developed for transferring information between computer processors (e.g., both synchronous and asynchronous serial communication devices), using communications interface conventions such as RS232C, RS449A and V.35. The binary coded signals may be transmitted in standard codes such as ASCII, EBCDIC, with established protocols providing for handshake procedures, starting, stopping and checking the data transmitted. Most of the systems for establishing communication links are designed for two-way transmission.

There are several ways to use optical technology for transferring information. One implementation of optical technology utilizes a combination of optical emitters and photosensors to transfer information. Typically, hardware is dedicated specifically to both devices of the transfer process to insure that the receiver and transmitter are set to operate at the same transmission rate or baud rate. The device to be loaded with information is placed in front of the emitters and the information transfer is started. Unfortunately, this method of information transfer also requires specialized hardware and is often not compatible with existing hardware installations.

As the use of portable information devices expands, there is an increasing need for such devices to be flexible in their functionality. Many existing portable devices have been designed for multiple functions, such as a combination watch/calculator. Wrist instruments have expanded from their time keeping role to include: databanking, chronometer, alarm, computation, odometer, paging, and communication functions. A disadvantage of many existing portable information devices is that they cannot easily be downloaded with programs providing new functionality. A further disadvantage of many existing portable information devices is that their databases cannot be easily updated without manually entering new data. The existing devices that can be updated typically have very limited input capabilities because they either have no keyboards at all or very rudimentary keyboards, or else they require that the updating occur from specific hardware. This severely limits the user's flexibility because the user must have easy access to updating hardware, which will most likely not be portable. Wristwatches in particular are difficult for entry of information or updating information. Various schemes have been proposed for entry of data using pushbuttons or tiny keyboards, none of which have been entirely satisfactory. An optimum configuration would be one where the portable device could be updated from any controllable light source such as a CRT video display screen found in desk size computer monitors and television sets.

A system has been proposed in co-pending U.S. patent application Ser. No. 08/155,326 filed in the names of Michael Jacobs and Mark Insero on Nov. 22, 1993 (now U.S. Pat. No. 5,488,571) and assigned to the present assignee. This application describes a system for transferring data from a CRT video display monitor on a personal computer to a portable information device such as a multi-function electronic wristwatch. The CRT video display has a video signal generator providing raster scanning of the screen and a program for formatting the binary coded data into blocks of serial data bits, with start bit and stop bit. The blocks of data are supplied to the video signal generator in synchronism with raster scanning of the screen so as to provide an integral number of one or more blocks of data for each vertical frame, and modulated to vary the brightness of the screen and provide light pulses which are seen by the operator as the presence or absence of horizontal spaced lines or line segments on the CRT corresponding to presence or absence of binary coded transmitter pulses. The portable information device is manipulated within line of sight of the CRT screen and has a photosensor to detect light pulses when the photosensor is directed toward the screen. Signals from the photosensor are amplified and filtered to remove ambient light source flicker and extraneous spurious light signals and to convert the receiver pulses to binary coded data blocks varying between high and low logic levels at a preselected pulse reception rate. The portable information device stores the received data for further use. Transmission of data is only in one direction—from CRT to the portable information device, which is not designed to send information back to the CRT.

One problem in such a system concerns a portable information device which is designed to receive data at a fixed or pre-defined data rate or baud rate, but which may need to receive data from CRT monitors having different vertical frame rates, different internal timing and different numbers of horizontal scan lines in each frame. Therefore if the portable information device is designed to accept data transfer at 2400 baud and light pulses are being emitted from the CRT at 2000 baud or 3000 baud, the data will be garbled and not received correctly. While a computer may be programmed so that it causes light pulses to be emitted at 2400 baud for correct reception, the program is designed for a monitor with known characteristics. Changing monitors or changing computers may render the data which is transferred to be unintelligible.

Accordingly, one object of the present invention is to provide an improved apparatus for synchronizing data transfer rate from a CRT video monitor to a portable information device.

Another object of the invention is to provide a portable information device with a photosensor which facilitates calibration of a PC with a CRT video monitor so that it matches the data receiving capability of the portable information device.

Another object of the invention is to provide an improved calibration process and program which facilitates calibration of a PC with a CRT video monitor so that it matches the data receiving capability of a portable information device, with a photosensor.

SUMMARY OF THE INVENTION

Briefly stated the invention comprises the method and apparatus for synchronizing the data transfer rate for downloading data from a cathode ray tube (CRT) adapted for transmission of serial data bits as light pulses appearing as spaced lines on the CRT at a selectable pulse repetition rate to a portable information device having a photosensor responsive to said light pulses with means adapted to receive and store binary coded data corresponding to said light pulses at a fixed pulse reception rate comprising:

(a) providing a calibration output signal means in said portable information device, (b) storing a calibration character comprising a block of binary coded data in said portable information device, (c) transmitting a block of serial data bits corresponding to said calibration character in the form of light pulses appearing as spaced lines on the CRT, (d) receiving said block of serial data bits via said photosensor on said portable information device, (e) comparing said received serial data bits with said stored calibration character, (f) activating said calibration output signal means after receiving at least one match of the received serial data bits with the stored calibration character, and (g) selecting a new pulse repetition rate by changing the line spacing of said spaced lines corresponding to said calibrator character on the CRT and repeating steps (c) through (e) in the absence of a signal from said calibration output signal means, until said new pulse repetition rate of the CRT data transmission may be received at the fixed pulse reception rate of the portable information device.

Preferably, a counter is provided and a successful comparison in step (e) is required for a number of successive matches before activating the calibration output signal.

The selectable pulse repetition rate may be automatically changed in increments by periodically changing the separation between lines on the CRT until an output signal is received and providing for an operator to halt the automatic process. Alternatively, the pulse repetition rate may be manually changed in increments by an operator, until an output signal is received.

DRAWINGS

Other advantages and objects of the invention will be better understood by reference to the following drawings, taken in connection with the accompanying description, in which:

FIG. 1 is a simplified partial elevational view of a preferred embodiment of the invention illustrating a data transfer system in which the data transmitter is a CRT monitor used in conjunction with a personal computer, and in which the information device is a multifunction electronic wrist instrument, FIG. 2 is a simplified partial plan view of the portable information device exemplified as a wrist instrument, FIG. 3 is a simplified elevational view of a CRT screen acting as a transmitter, FIG. 4 is a simplified graph illustrating typical phosphor persistence and timing in conjunction with a CRT raster, FIG. 5 is a graph illustrating displayed light pulses during one CRT frame period, FIG. 6 is a graph depicting receipt of asynchronous serial data transmitted by the portable information device during the same CRT frame period corresponding to FIG. 5, FIG. 7 is a block diagram of the circuitry of a typical portable information device, FIG. 8 is a flow chart depicting operation of the microcontroller of an electronic wristwatch when reading the CRT, FIG. 9 is a flow chart depicting a typical data reception sequence of a portable information device, FIGS. 10a–10d (hereinafter referred to as FIG. 10) are a flow chart depicting a typical data transmission sequence of a CRT monitor used as a controllable light source, FIGS. 11a and 11b (hereinafter referred to as FIG. 11) are a flow chart depicting the operation of a user interface protocol, FIG. 12 is a simplified, partial elevational view of a modified data transfer system using a CRT monitor of a personal computer as a data transmitter and using a hand held telephone menu and appointment scheduling device serving as the portable information device, FIG. 13 is a top plan view of the hand held device, FIG. 14 is a bottom plan view of the hand held device, FIGS. 15 and 16 are elevational views of CRT screen displays of two data transfer rate calibration patterns in accordance with the present invention, FIG. 17 is a flow chart depicting calibration response software in an electronic wristwatch, FIG. 18 is a flow chart depicting calibration procedure in a personal computer, using manual calibration, and FIG. 19 is a flow chart depicting calibration procedure in a personal computer, using automatic calibration.

DESCRIPTION OF THE PREFERRED EMBODIMENT

Figure 1:
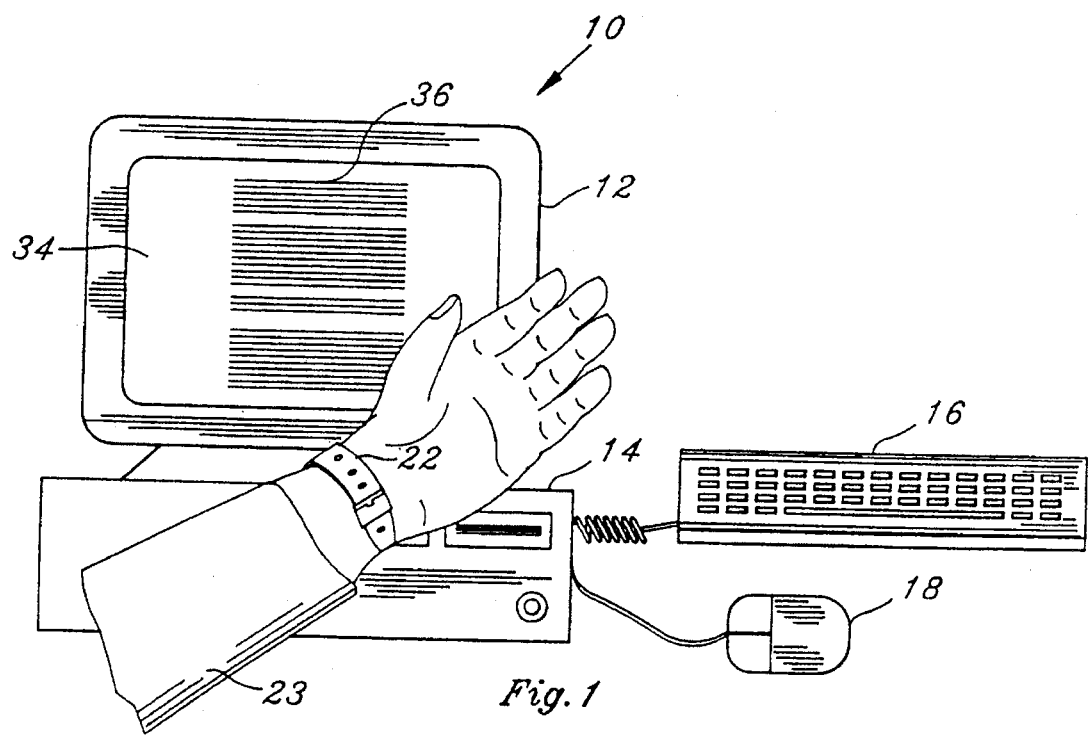
Figure 2:
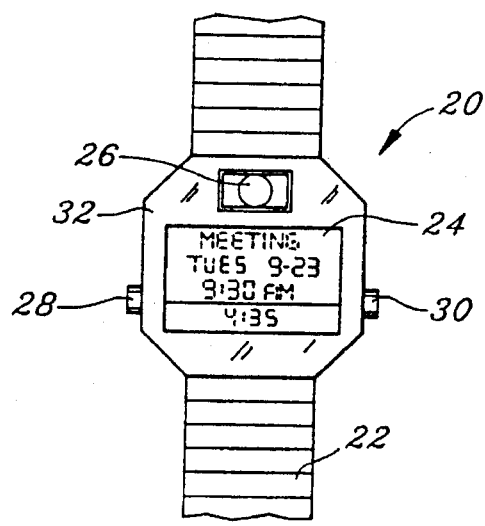

Referring to FIG. 1 of the drawing, a controllable light source and data transmitter shown generally as 10 includes a conventional CRT monitor 12, conventional computer 14, keyboard 16 and mouse 18. The portable information device comprises a multifunction electronic wristwatch seen as 20 in FIG. 2 held by a strap 22 on the wrist of a user 4. The output for the portable information device or wristwatch 20 may be a dot matrix liquid crystal display (LCD) 24 used to display the time, date or other common timepiece functions in addition to functioning as an output display for any of the computer functions that are downloaded into portable device 20. Device 20 also includes a photosensor 26 and one or more operating switches 28, 30, all disposed on a casing 32. The casing 32 may be manipulated as shown in FIG. 1 so as to direct photosensor 26 toward CRT monitor 12 at a comfortable distance of about one foot (30 cm) from the monitor, so that it is spaced from, and within line of sight of the monitor 12.

The CRT monitor includes a conventional screen 34 on which are displayed binary coded data, transmitted asynchronously as sequential scan line segments 36.

The transmitted data may come from a source of data contained within the computer 14, such as data stored in the computer memory. Alternately the source of data could be received asynchronously from an outside source such as a modem connected to a remote data source and transmitted immediately to the monitor 12 via the computer 14 or stored for later transmission. If the CRT is a video display for a television, the data source may be the antenna input or cable tv input which is coupled to appropriate circuitry controlling the television picture on the CRT.

Figure 3:
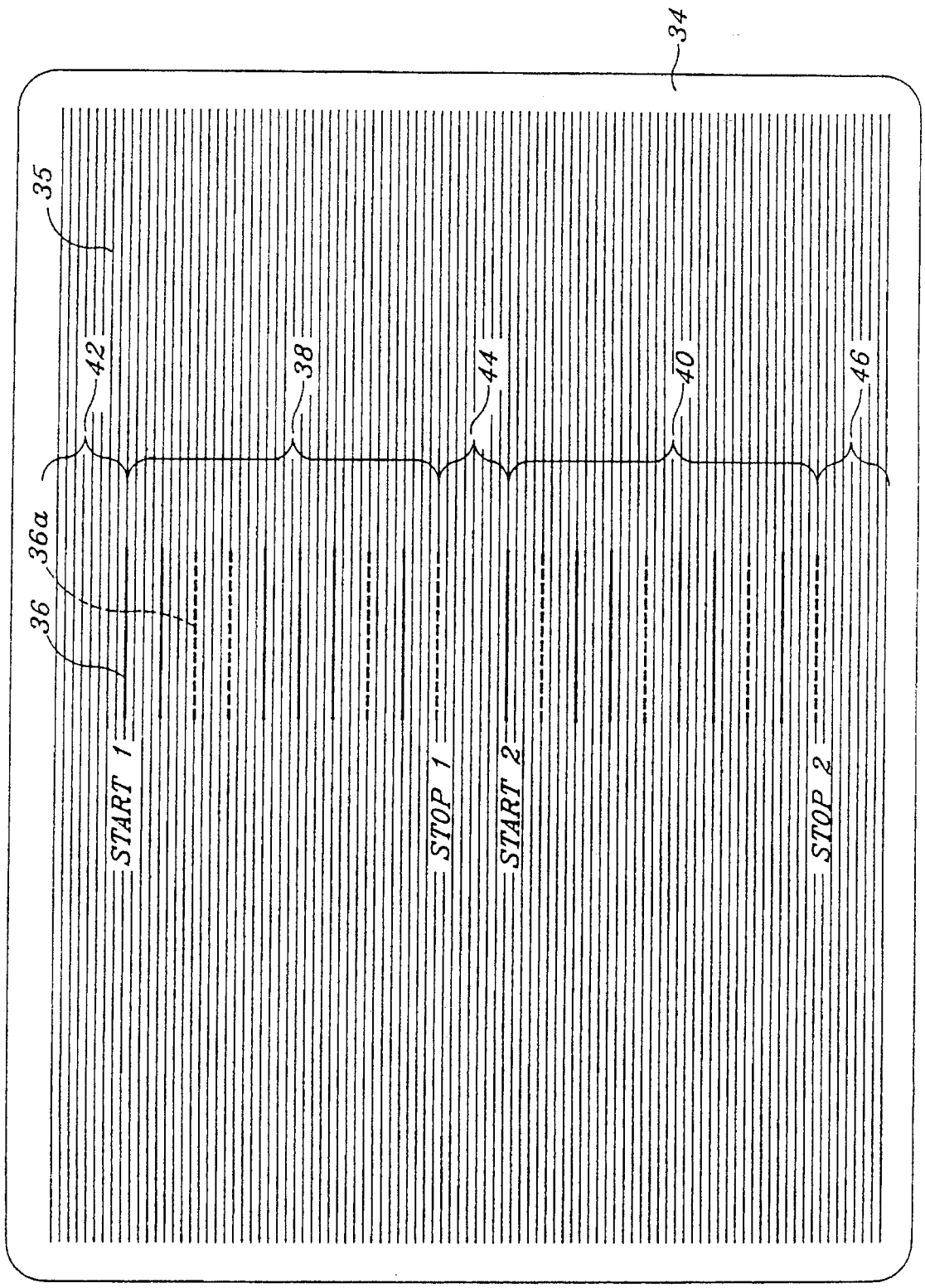

FIG. 3 is an enlarged view of CRT screen 34 showing only one type of data transfer pattern possible with the invention. In this case, the successive CRT scan segments 36 are arranged to appear successively so as to transmit two blocks 38, 40 of binary coded data as a stream of light pulses. Blocks 38, 40 are transmitted during the interval of one vertical scan of the CRT raster, and there are an integral number of blocks per frame, here two blocks, which may leave intervals 42, 44, 46 when the vertical scan is active, but when no data is being transmitted.

Any conventional CRT video driver may be used, either monochrome or color, having a conventional video signal generator which may be modulated to vary the brightness of the signal (or to vary the luminance in the case of a color monitor). For example, a VGA monitor with 640×480 resolution may be used which has a horizontal scan frequency of 31.5 kHz and a vertical scan rate (vertical refresh rate) of 60 Hz. Raster horizontal scan lines 35 are shown for every eighth horizontal scan line, omitting intervening scan lines for clarity.

Referring to FIG. 3, the two blocks 38, 40 appearing on screen 34 comprise binary coded data in one of the conventional formats and using any desired conventional code and protocol suitable for asynchronous serial data transmission. Here the selected convention for the data transmission protocol consists of a start bit, eight data bits, and a stop bit. A scan line segment 36 which is activated at high brightness represents binary logic 0, and a scan segment which is not illuminated represents a binary logic level 1, indicated by the dashed line 36a. In the convention selected, the start bit is logic level 0 and the stop bit is logic level 1. Either logic convention may be selected, and if desired, an illuminated segment may represent logic level 1.

A suitable video driver program is stored in computer 14, which is arranged to modulate the video signal generator to increase the brightness of the screen at selected coordinates on screen 34 from the beginning to the end of each selected scan line segment 36 representing binary logic 0. As is well known in the art, the raster scan by the electron beam energizes successive dots of phosphor, the brightness of which dots persists after they have been energized. The speed of data transmission which may be effected in the subject invention depends to some extent on the persistence of the phosphor as well as the speed of response and threshold level of the photodetector circuit.

Figure 4:
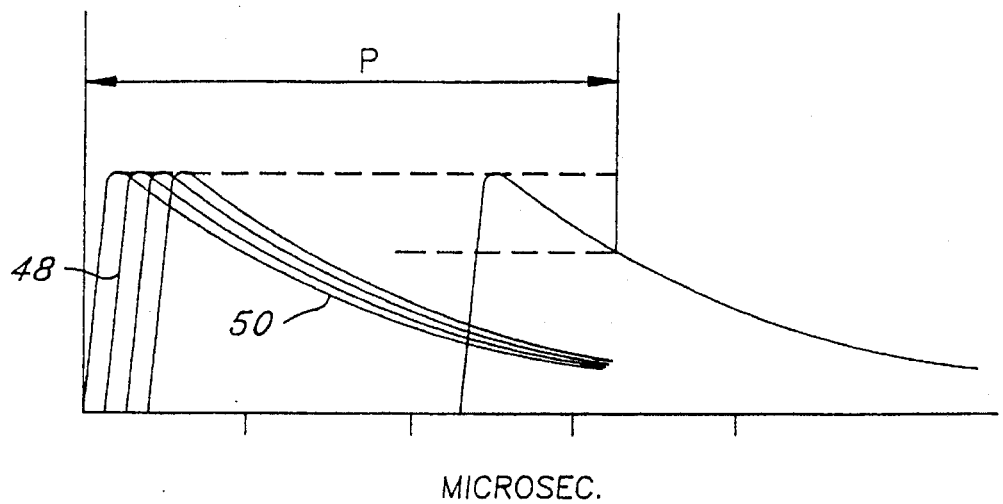

Reference to FIG. 4 shows a representative graph for phosphor brightness (expressed as a percentage) versus time. An illuminated scan line segment 36 is made up of a series of individual dot or pixel excitations lasting only a fraction of a microsecond. When the phosphor is energized, it builds up brightness during the excitation period in a process called fluorescence shown at reference 48, and then the brightness decays during a period of time determined by the persistence of the phosphor known as phosphorescence shown at reference 50. Successive pixels (not shown to scale) are energized rapidly and depending upon the threshold of the phototransistor in the photosensor, and its frequency response, is "seen" by the photosensor only as a single light pulse P.

Figure 5:
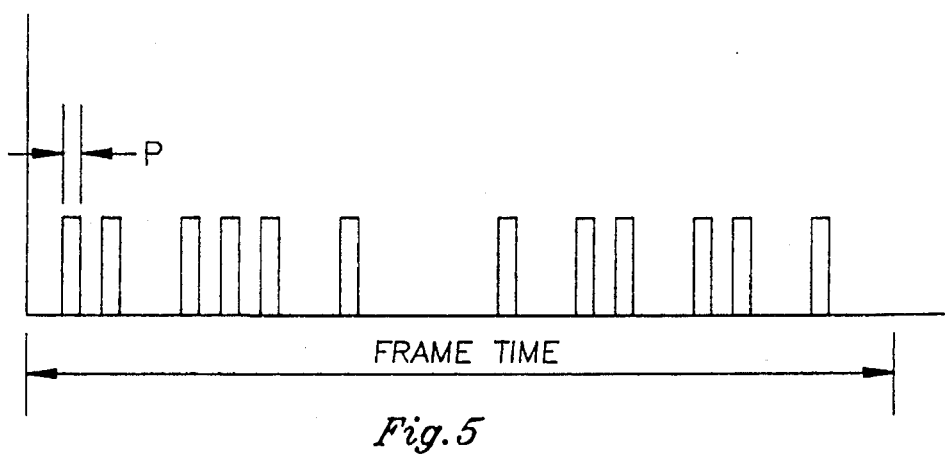

Referring to FIG. 5 of the drawing, the greatly expanded time scale depicts the time of a complete CRT frame. At the vertical scan rate selected of 60 Hz, this is 16,667 microseconds. A series of light pulses P represent logic 0 (or do not occur to represent logic 1) at a preselected pulse repetition rate. The pulse repetition rate is selected by programming the location on the CRT screen (bit mapping the screen coordinates) where the scan line segments for start bit, data bits and stop bit will start and stop. The scale of FIG. 5 is greatly exaggerated with respect to the width of pulses P, which only exist during a portion of a horizontal scan line. For example, at a horizontal scan frequency of 31.5 kHz, the time required to scan one horizontal line is about 32 microseconds. Therefore the time period of a pulse P (corresponding to an illuminated scan segment) may be approximately 10 or less microseconds, or if desired it may occupy the full length of a scan line. Thereafter, there is a time interval of several scan lines including the required raster flyback time until the next pulse P is displayed. This appears as a space between each of the horizontal line segments 36. Therefore the pulse repetition rate is substantially less than the horizontal scan frequency. According to the present invention, the line spacing may be varied to adjust or select the pulse repetition rate during synchronization or calibration of the data transfer rate.

A conventional communications program in computer 14 may format the binary coded data to be transferred into blocks of serial data bits and transmit the blocks to the video signal generator of the CRT in synchronism with raster scanning of the screen so that successive integral data blocks such as data blocks 38, 40 from the data source appear on each successive CRT frame, i.e., two data blocks are transmitted each time the CRT screen is refreshed. The data is sent in serial form as RZ (Return to Zero) pulses.

Figure 7:
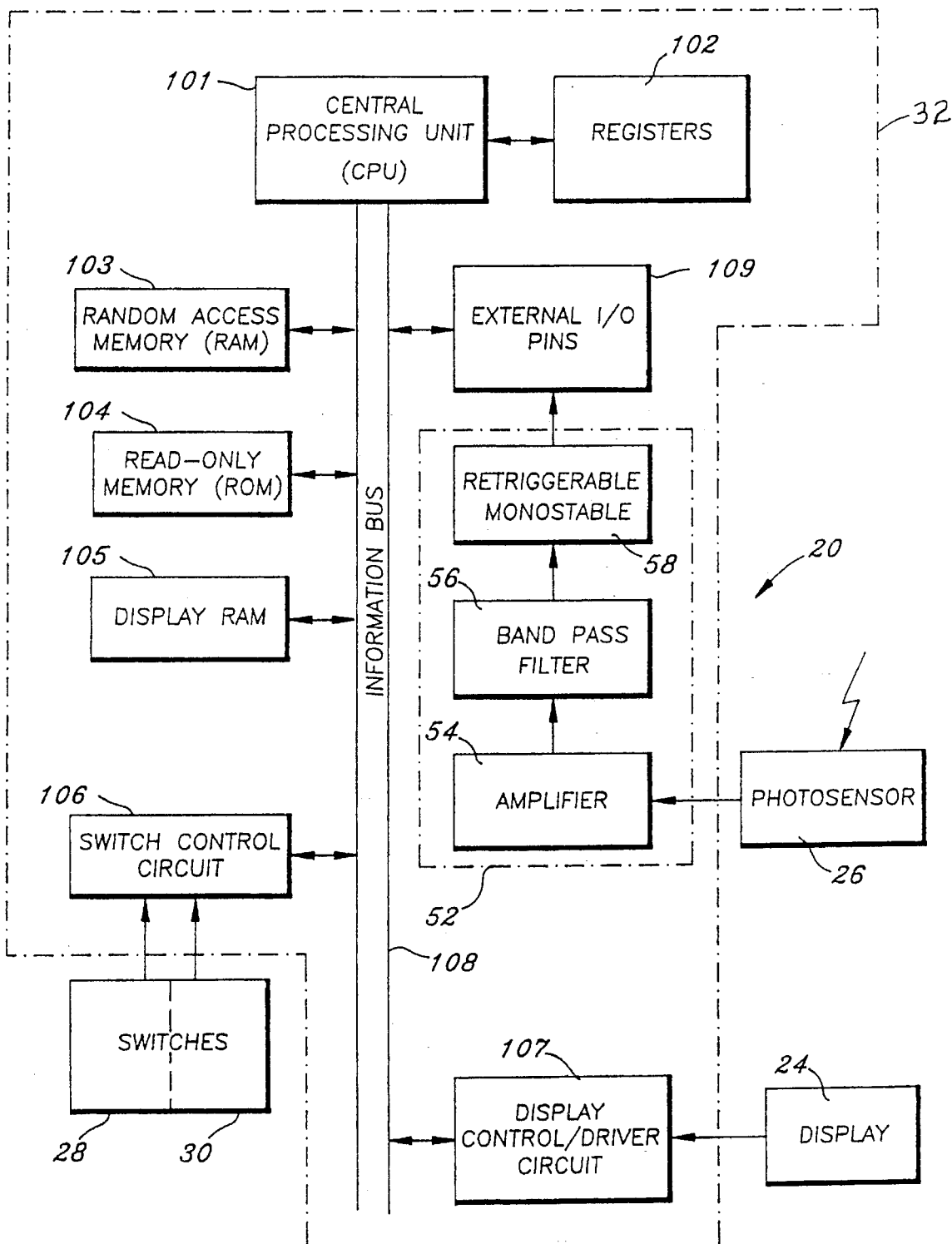

FIG. 7 shows the internal configuration of portable information device 20. Control of device 20 is accomplished by central processing unit (CPU) 101, which is directly connected to registers 102. CPU 101 utilizes registers 102 to temporarily store data during information processing. CPU 101 is coupled to the remaining internal hardware via information bus 108. CPU 101 accesses random access memory (RAM) 103 via bus 108 for data storage and retrieval during various operations (e.g., storage of telephone numbers). Read-only memory (ROM) 104 is used to store the initial power-up programs for CPU 101, as well as other information (e.g., model number, serial number), such as a suitable operating program for controlling alternate functions (e.g., timekeeping in the case of a wristwatch) and is also coupled to CPU 101 via bus 108.

Display RAM 105 is also connected to bus 108, and is used by CPU 101 and display control/driver circuit 107 to control watch display 24. Display circuit 107 is connected between bus 108 and display 24. Photosensor 26 is coupled to CPU 101 through interface circuit 52 to external I/O pins 109, which are connected to bus 108. Switches 28 and 30 are connected to switch control circuit 106, which is connected to bus 108. CPU 101 controls the operation of device 20 based upon inputs from the switches and photosensors, as well as current system status.

The aforementioned elements 101 through 109 are preferably incorporated as a single integrated circuit contained within the casing 32 of the portable information device 20 (here an electronic multifunction wristwatch). For example, such a microprocessor-based integrated circuit is available from Motorola Corporation as model MC68HC05HG, including a timer, real time clock system, asynchronous serial interface, synchronous serial interface, LCD drivers, keyboard, switch and electroluminescent lamp outputs, with ROM and RAM memory adapted to store data as described in this application.

The asynchronous serial interface of the Motorola integrated circuit is adapted to receive asynchronous serial data at two different fixed pulse reception rates and standard NRZ (mark/space) format with one start bit, eight data bits and one stop bit. Using a quartz crystal driven oscillator at the design frequency of 38.4 kHz, the receiver baud rate is software selectable through programmable means to either of two fixed baud rates −1200 baud or 2400 baud. Using a quartz crystal driven oscillator at 32.768 kHz and selecting the fixed 2400 baud rate, the receiver will accept data transmitted at a fixed pulse reception rate of 2048 baud. (This is a non-standard baud rate due to use of a 32.768 kHz quartz crystal rather than a 38.4 kHz crystal.) The pulse reception rate for 2048 baud is 2048 pulses per second. The "effective" rate of transmission will be less than 2048 baud because one or more intergral data blocks are transmitted during one frame, and there may be idle times between blocks.

The light pulses seen by photosensor 26 contain data information but they are unsuitable for receipt by external I/O pins 109. Transformation of the data to a suitable NRZ serial format, as well as filtering out high and low frequencies for removal of extraneous light sources, is carried out by interface circuit 52. Interface circuit 52 may be a separate integrated circuit disposed inside casing 32 comprising amplifier 54, band pass filter 56 and retriggerable monostable 58.

Figure 8:
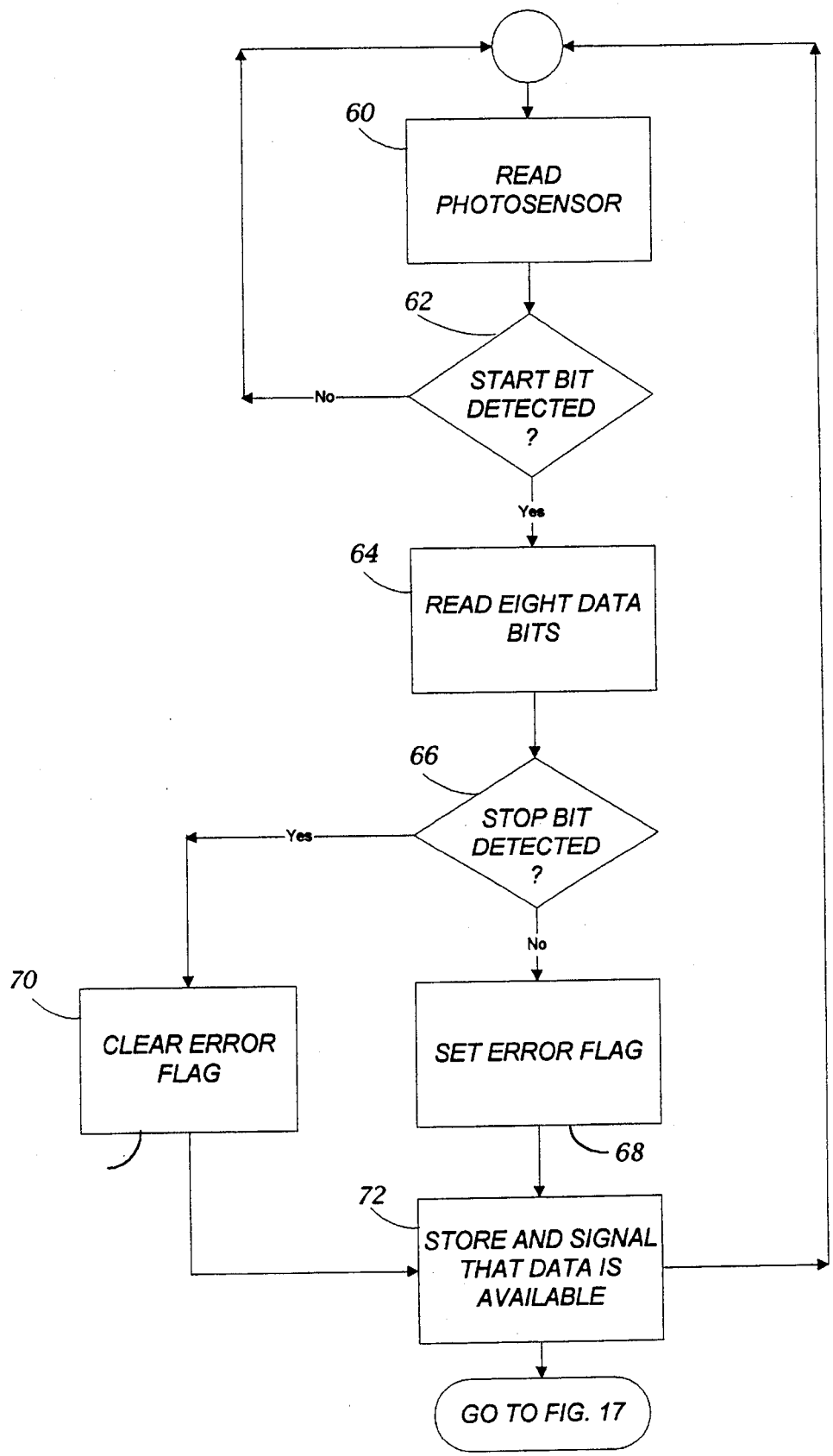

Referring to FIG. 8 of the drawing, a flow diagram is illustrated depicting operation of the above-described portable information device 20 embodied as an electronic multifunction wristwatch. The microcontroller is adapted through internal software when placed in the asynchronous data receiving mode to perform the operations indicated in FIG. 8 according to an eight bit NRZ serial format, thereby enabling reading of successive blocks of binary data representing successive "characters". The data receiving mode of the electronic wristwatch shown in FIG. 8 is used both for normal reception of data to be stored in the portable information device memory, as well as for the calibration procedure which is the subject of the present invention. The photosensor (26 in FIG. 7) is read at 60 and, after conditioning in interface circuit 52, the byte is input via the microcontroller asynchronous data input pins 109, where a suitable subroutine stored in read only memory (ROM) 104 detects whether or not the first bit of the signal represents a start bit. This is illustrated as operation 62, which is a test procedure well known in the art. If the signal is a start bit, the next successive eight bits are read as data and the next successive bit is checked at 66 to determine whether it is a stop bit. If not, an error flag is set at 68 (or the error flag is cleared at 70), and the subroutine provides an output at 72 indicating that data is available. The presence of the error flag serves to indicate that an error has occurred due to some failure such as not receiving a stop bit or other indication that invalid data is being received. The absence of an error flag indicates that a block of 8 data bits (or one byte) has been received for further processing. However, the absence of an error flag does not indicate that the byte received by the watch is the same as the byte sent by the CRT. To insure this is the object of the present invention.

In order to perform information transfer using portable device 20 and data transmitter 10, the user must begin by putting display 34 in download mode via a software application program stored in memory of computer 14. The program includes a signal generation means which, in addition to other functions which are described below, creates a data transfer pattern or guide consisting of sample data blocks 36 and 38. The data transfer pattern is then displayed. These sample images are used by the portable information device program to compare baud rate of portable device 20 with pulse repetition rate of data transmitter 10. For additional user convenience, the location and size of the data transfer pattern on display 34 can be varied by inputs from keyboard 16. The user can set portable device 20 to download mode by depressing control switches 28 or 30, or alternatively, the photosensor 26 can be connected to the interrupt input pin (not shown) of portable device 20, which would cause portable device 20 to automatically switch to download mode. Next, the user places portable device 20 in front of display 34. This is done by manipulating the wristwatch case at a convenient distance, e.g., six inches to three feet (15 to 100 cm) from screen display 34, so that photosensor 26 is aimed at the screen.

If data transmitter 10 is a computer, the user may depress a key on computer keyboard 16 to initialize data transfer. If data transmitter 10 is a television set, information to be transferred may be continuously transmitted at intervals. In either case, the signal generation means then executes a communications protocol which is used to control the transfer process. The communications protocol is also resident on the transmitting information source (as part of the signal generation means), whether it is a computer connected directly to monitor 12 or a computer coupled to the transmitter at a television station. In this manner, the only modification that is required for data transmitter 10 is the installation of software. Various communications protocols could be designed by those skilled in the art without departing from the scope and spirit of the invention. Characteristics of one sample protocol are now described in detail.

The communications protocol begins by directing monitor 12 to transmit a signal which forces portable device 20 to a known condition. This is followed by sending an address of the receiving device (such as the model number). If this is correctly received by portable device 20, it beeps, signalling the user that information transfer is beginning. Information transfer is accomplished by setting the sequentially transmitted bits making up the data transfer pattern of blocks 38, 40 to be either bright (signifying a digital low signal) or background (signifying a digital high signal). During information transfer, blocks 38, 40 and subsequent blocks of data are seen by the eye as a series of "images" generated by each pass of the vertical frame of CRT 34. Actually they are a series of sequential light pulses. At each pass of the vertical frame, two blocks of 8 bit binary coded data are captured by the photosensor. By utilizing relatively large intervals between data bit locations and using the entire screen as background, portable device 21 may receive data at relatively low baud rate, if desired. Additionally, arrangement of integral data blocks and calibration so as to synchronize data transfer within a vertical frame can be accomplished with the present invention so that portable device 20 will be compatible with most existing CRTs regardless of the CRTs' vertical frame rate, or other scanning characteristics. Therefore, no hardware changes are necessary to enable information transfer using existing CRTs.

Figure 6:
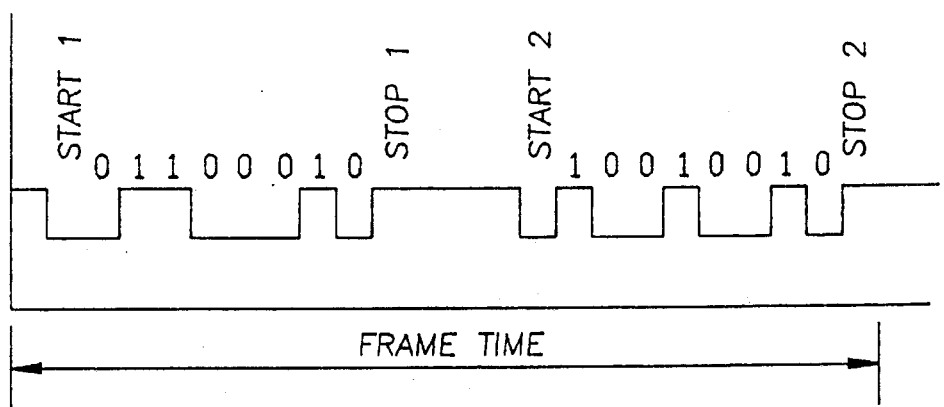
Figure 9:
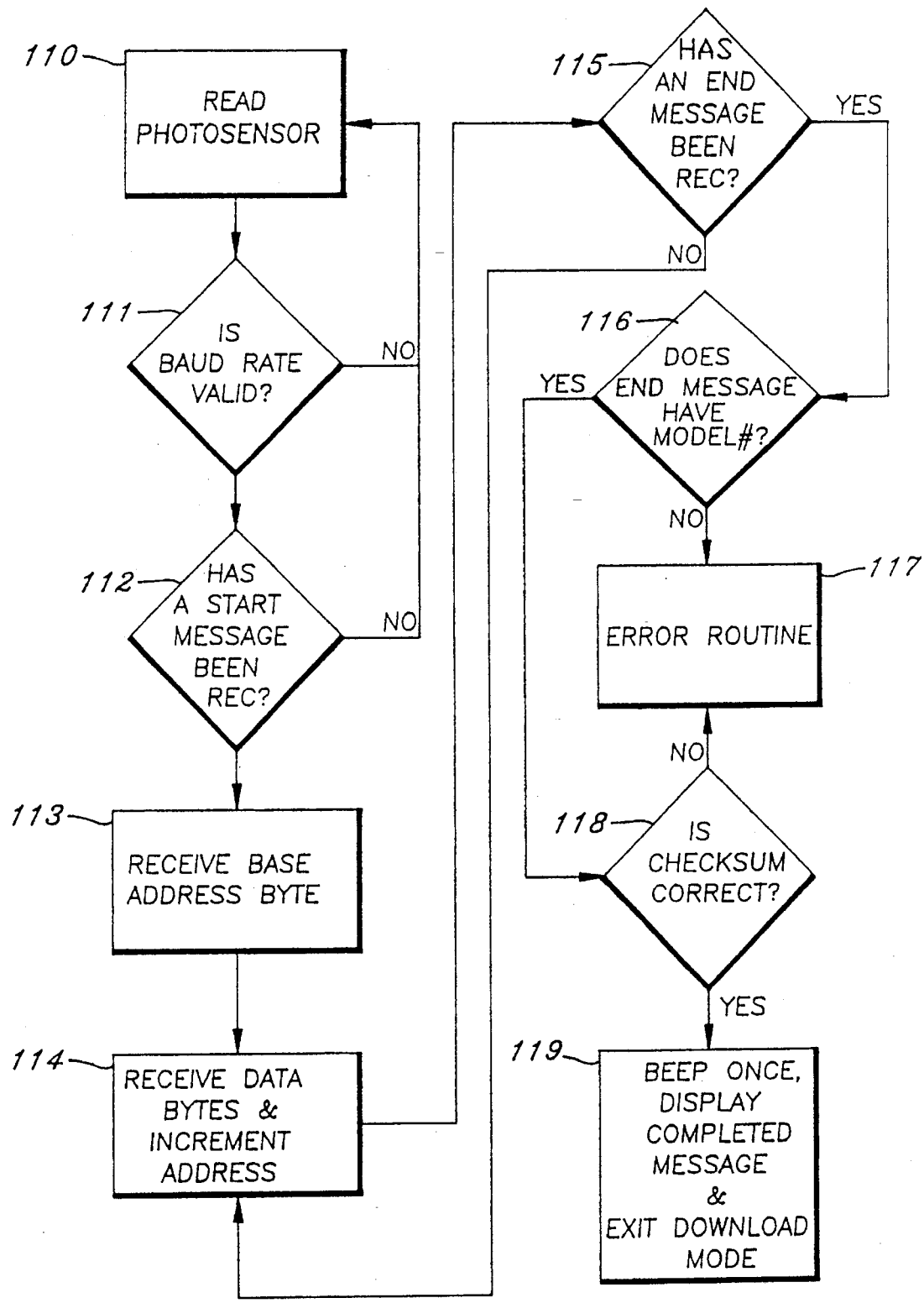
Figure 10A:
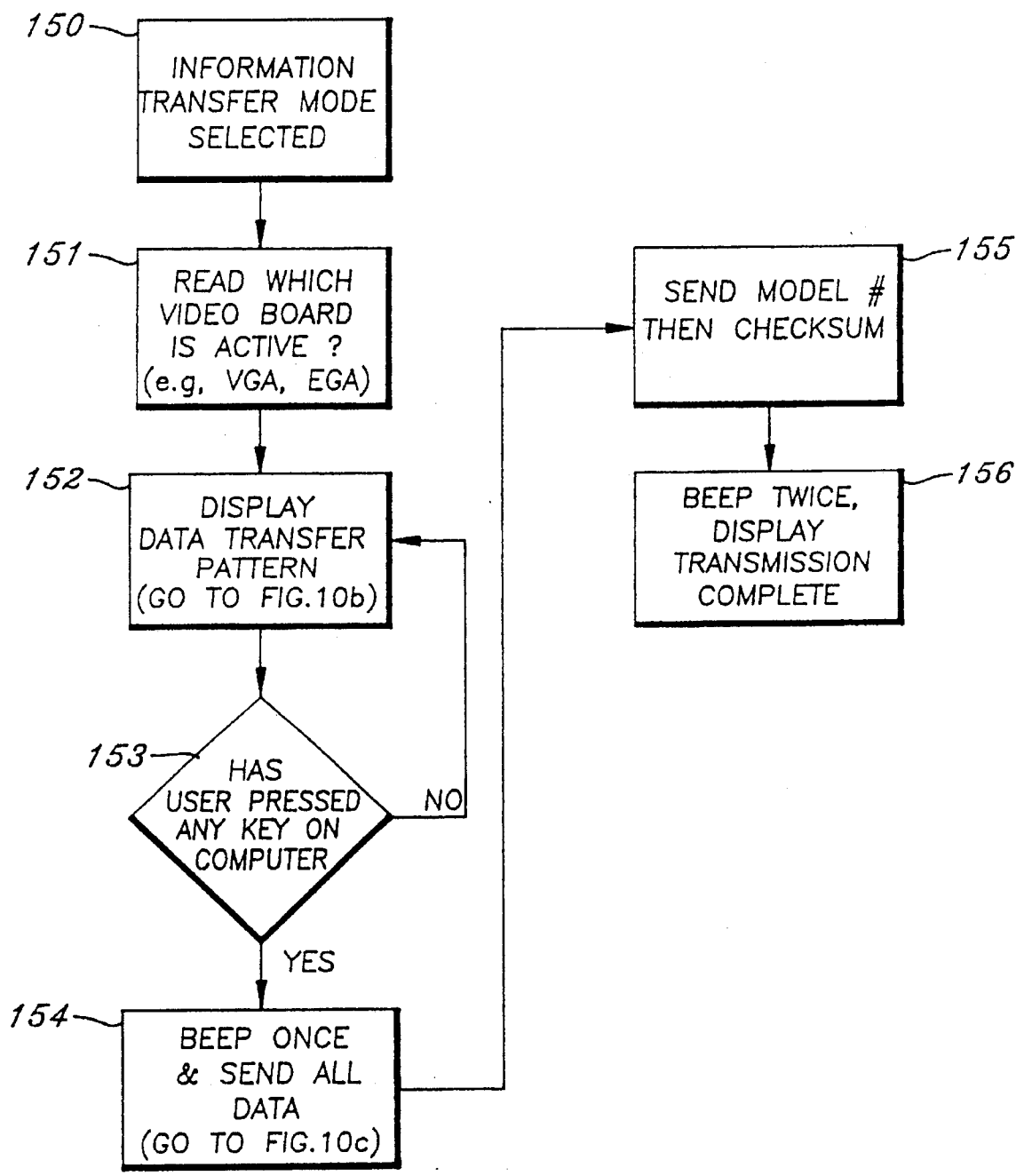
Figure 10B:
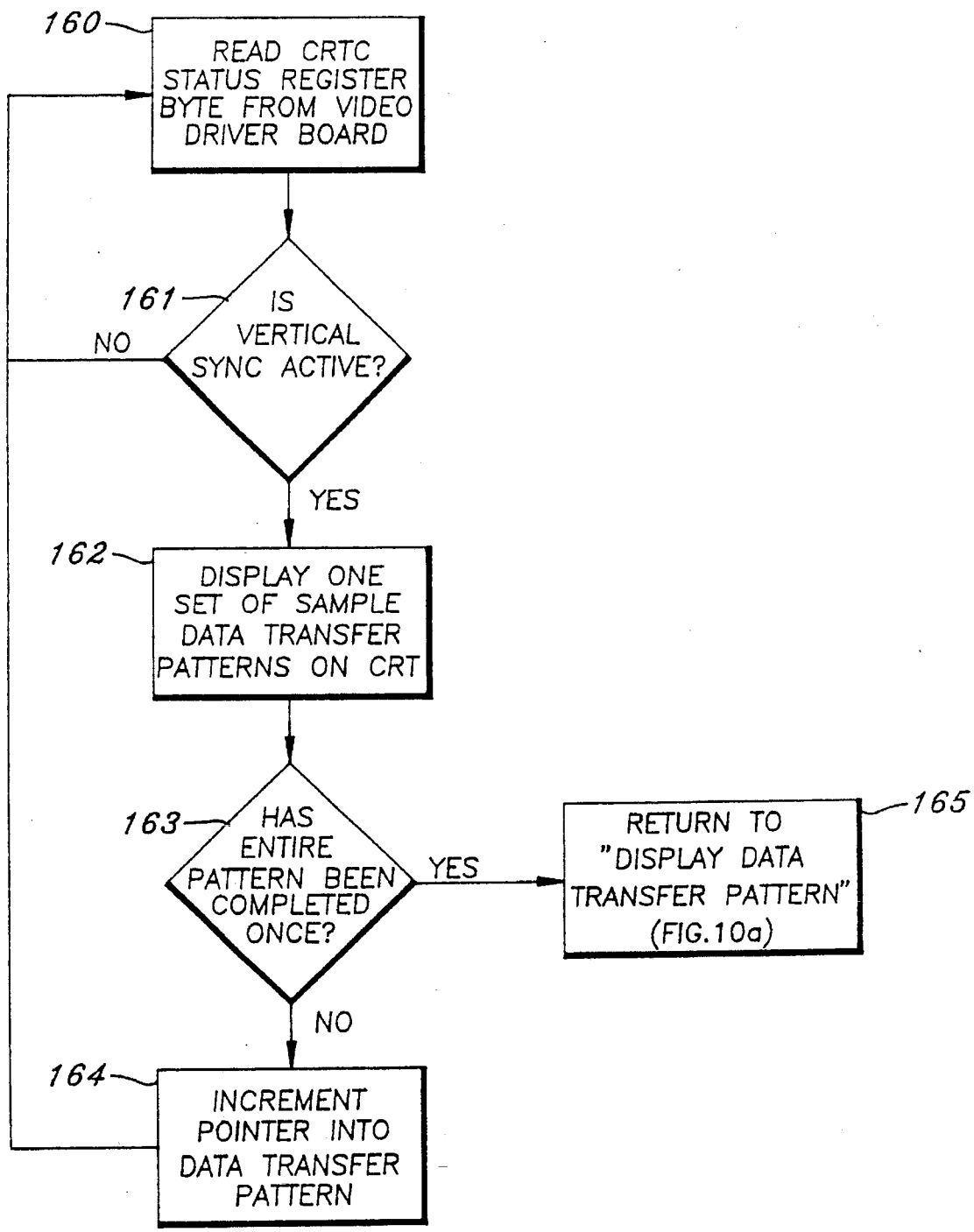
Figure 10C:
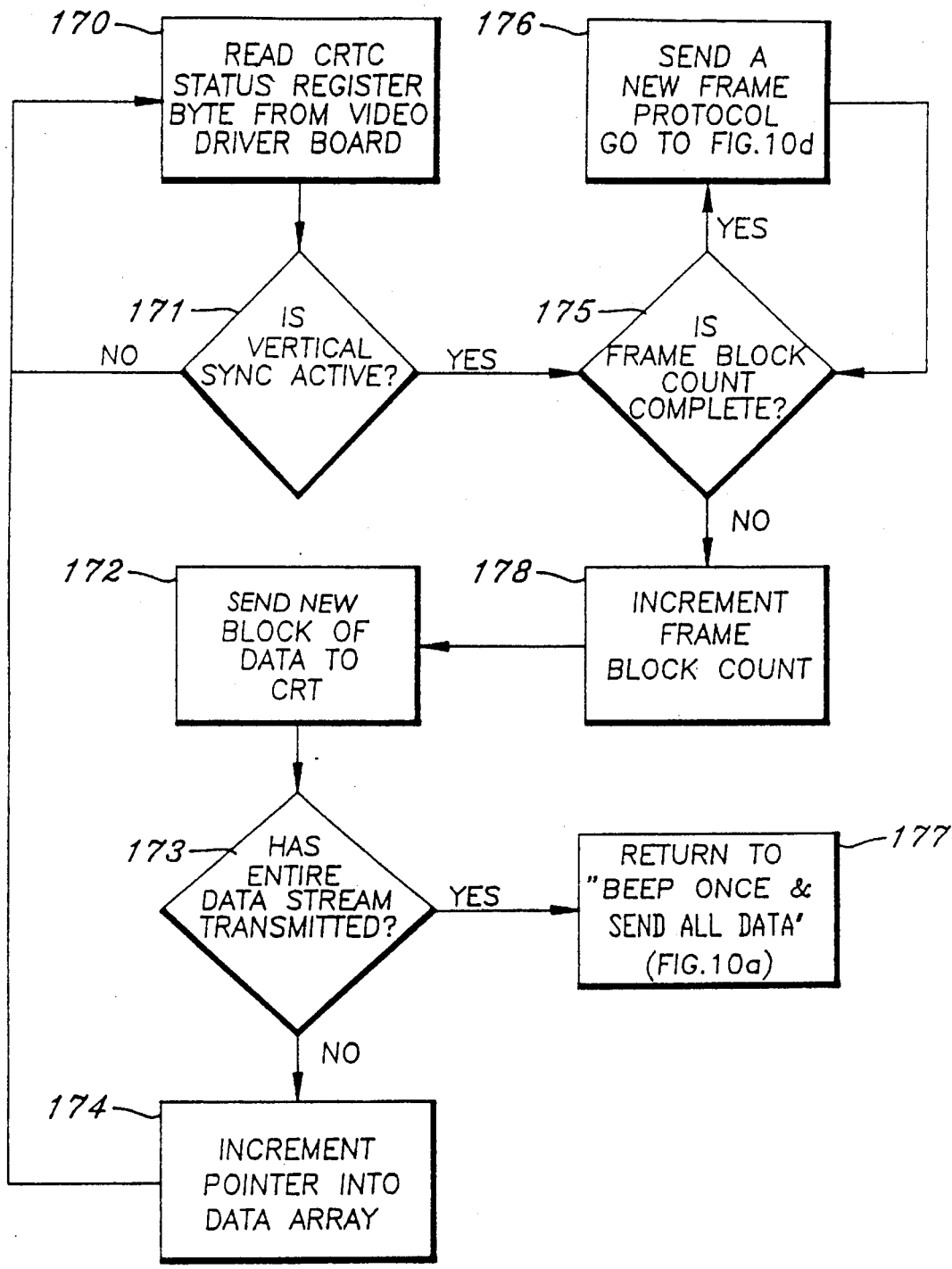
Figure 10D:
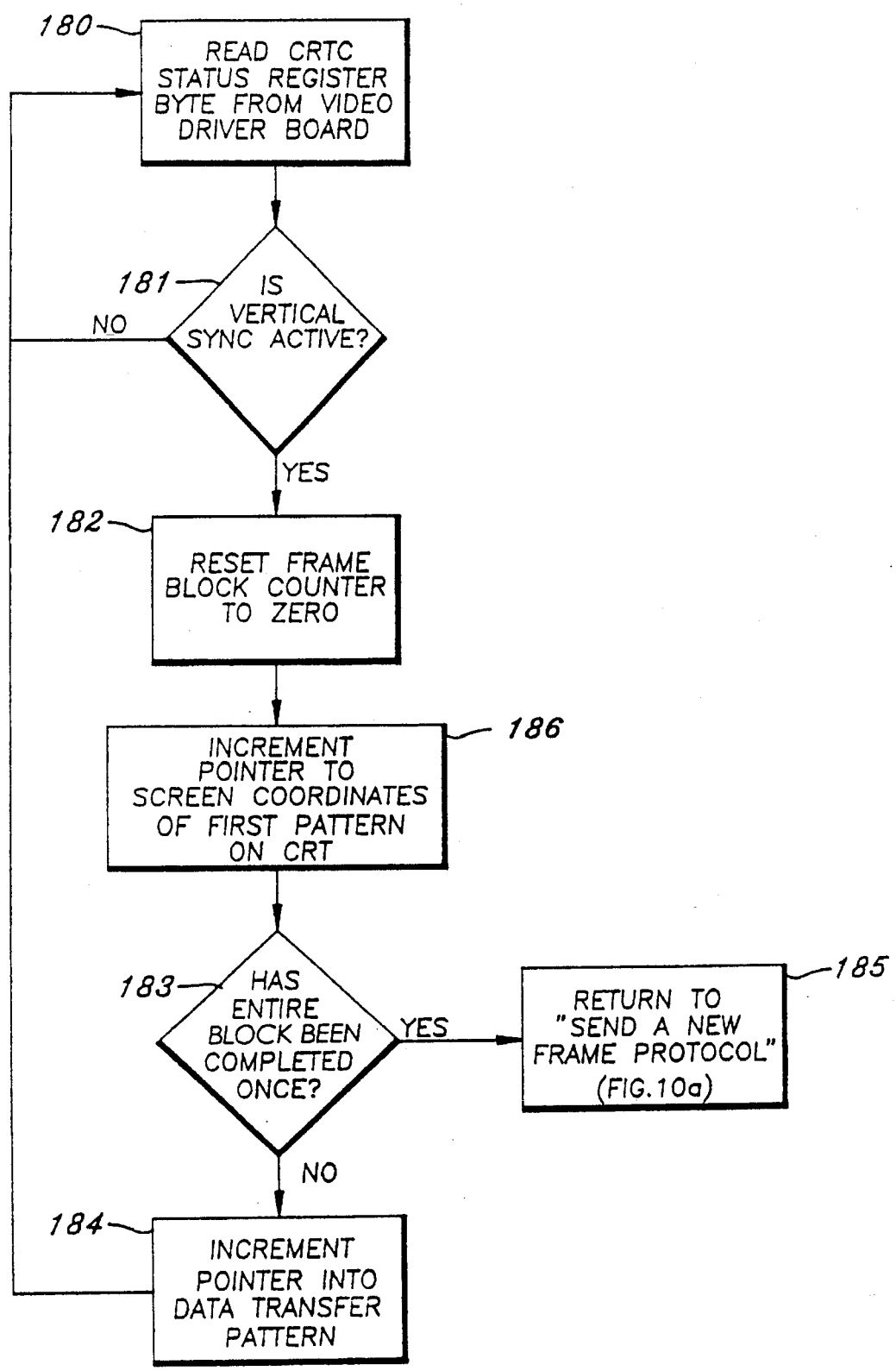

FIG. 6 depicts the receipt by portable information device 20 of the flow of binary coded data during each CRT frame as a continuous stream of high and low logic levels corresponding to the presence or absence of a pulse in FIG. 5. The processing of the data by portable device 20 is detailed below as shown by the flow diagram of FIG. 9. More specifically, the process commences when the internal ROM program directs the central processing unit (CPU) 101 to read the signal level on external pins 109. This is captioned "Read Photosensor" at block 110 in FIG. 9.

Once the photosensor has been read (step 110), an initial check is made to insure that baud rate is still valid (step 111). The system then checks to see if a start message has been received (step 112). The start message may be any predetermined value or series of values. For example, the start message can be a pair of zeros followed by the model number of the watch. Until the start message is received, device 20 loops back to determine if photosensor logic level has changed (step 110). After the start message has been received, the next message is the base address byte (step 113), containing the starting address where the input information should be loaded. This is followed by data bytes and address incrementing (step 114). A test is then conducted to determine if an end message was received. This message is similar to the start message, and could also be a pair of zeros followed by the model number of device 20.

If there is still data to be transmitted, device 20 loops back to receive data (step 114), until all of the data, and an end message, has been received. A test is then made to verify that the correct model number was received (step 116), and if not, error routine 117 is called. If the proper model number was received, a checksum is produced and verified, and if the checksum is invalid (step 118), error routine 117 is also called. If no errors are evident, device 20 beeps once, displays a "Completed Transfer" message, and exits download mode (step 119). As previously stated, various protocols may be implemented by those skilled in the art without departing from the scope and spirit of the invention. For example, the protocol may be implemented using 6-bit words, 8-bit words, 16-bit words, or any other practical size words.

Information transmission by the data transmitter 10, including the generation of data blocks, is shown in the flow chart of FIGS. 10*a* through 10*d*. Information transfer begins with information transfer mode selected (step 150). CPU 101 sends out a request to read which video board is active (step 151), so that the proper video signals may be applied. Once the type of video board has been read, the data transfer pattern is displayed (step 152). Displaying the data transfer pattern entails first reading the CRTC status register (step 160). Next, a check is made to determine whether vertical sync is active (step 161). If vertical sync is not active, control is returned to status register step 160, until vertical sync becomes active. Once vertical sync is active, a vertical frame of data transfer patterns is displayed on the CRT (step 162). Then, a check is done to determine whether the entire pattern has been completed once (step 163). If the pattern is not complete, control transfers to status register step 160. Once the pattern is complete, control goes back to display data transfer pattern step 152 via return block 165.

After the data transfer pattern has been initially displayed, a test is made to determine whether the user has operated manual key input means, i.e. has pressed a key on the computer keyboard 16 or clicked the mouse 18 (step 153), which initiates data transfer. Once a key depression is detected, the transmitter beeps once and sends all of the data (step 154). This data transfer begins with reading the CRTC status register (step 170). A check is performed to determine if the vertical sync is active (step 171). If vertical sync is not active, control returns to step 170, until it becomes active. Once active, the system determines if the frame block count is complete (step 175). The frame block count is the number of data blocks transmitted during each frame, here two blocks. If the frame block count is not complete, the frame block counter is incremented by one and a new block of data is sent to the CRT (step 172). If the frame block count is complete, a new frame is commenced (step 176).

A new frame is commenced by reading the CRTC status register (step 180), then checking to see if the vertical sync is active (step 181). If sync is not active, the sync is rechecked via step 180. Once vertical sync is active, the frame block counter is reset to zero (step 182) and a new frame is commenced when the screen pointer is incremented to the screen coordinator of the first data block (step 186). A test is made to determine if the entire data block has been completed (step 183). If part of the block has not been displayed, control goes to status register step 180. After the entire block has been displayed, control returns to send a new frame protocol 176, via return block 185. New frame protocol 176 is accessed anytime the data block is lost, regardless of whether such loss is due to the user or other reasons.

Once the signal has been verified, computer 14 sends a block of data including start bit and stop bit to the CRT (step 172). This is followed by a test to see if the entire data stream has been transmitted (step 173). If data remains to be transmitted, the pointer into the data array is incremented (step 174), and control returns to status register step 170. Once the entire data stream has been transmitted, control transfers back to beep once (step 154), via return block 177.

Following the complete transfer of the data, the transmitter sends the model number of the unit, followed by a checksum (step 155), which the portable device 20 utilizes to verify the accuracy of the data transmission.

Once all of the information has been transferred, the address is resent, followed by a checksum. The transmitted checksum is compared to the checksum calculated by portable device 20 to verify the accuracy of the information transfer. If the transfer was successfully completed, portable device 20 beeps twice and displays "TRANSMISSION COMPLETE" (step 156) or other appropriate message on display 24. Otherwise, portable device 20 beeps continuously and displays "ERROR" on display 24. The information that is transferred can: (1) add functionality to a multifunction electronic watch, (2) update a database within a multifunction electronic watch, or (3) it can automatically reset the time or date of a multifunction electronic watch.

An additional capability of the information transfer process is downloading data. For example, portable device 20 can also be used as a telephone number retriever. Manual entry of the telephone numbers and corresponding names into the portable device 20 requires either additional entry keys (for the entire alphabet) or complex keystrokes. Direct entry of a long list of phone numbers would be a cumbersome, physically straining process, prone to data entry error. Instead, portable device 20 allows a user to maintain a database on a computer (which probably already exists) and simply download the data.

Figure 11A:
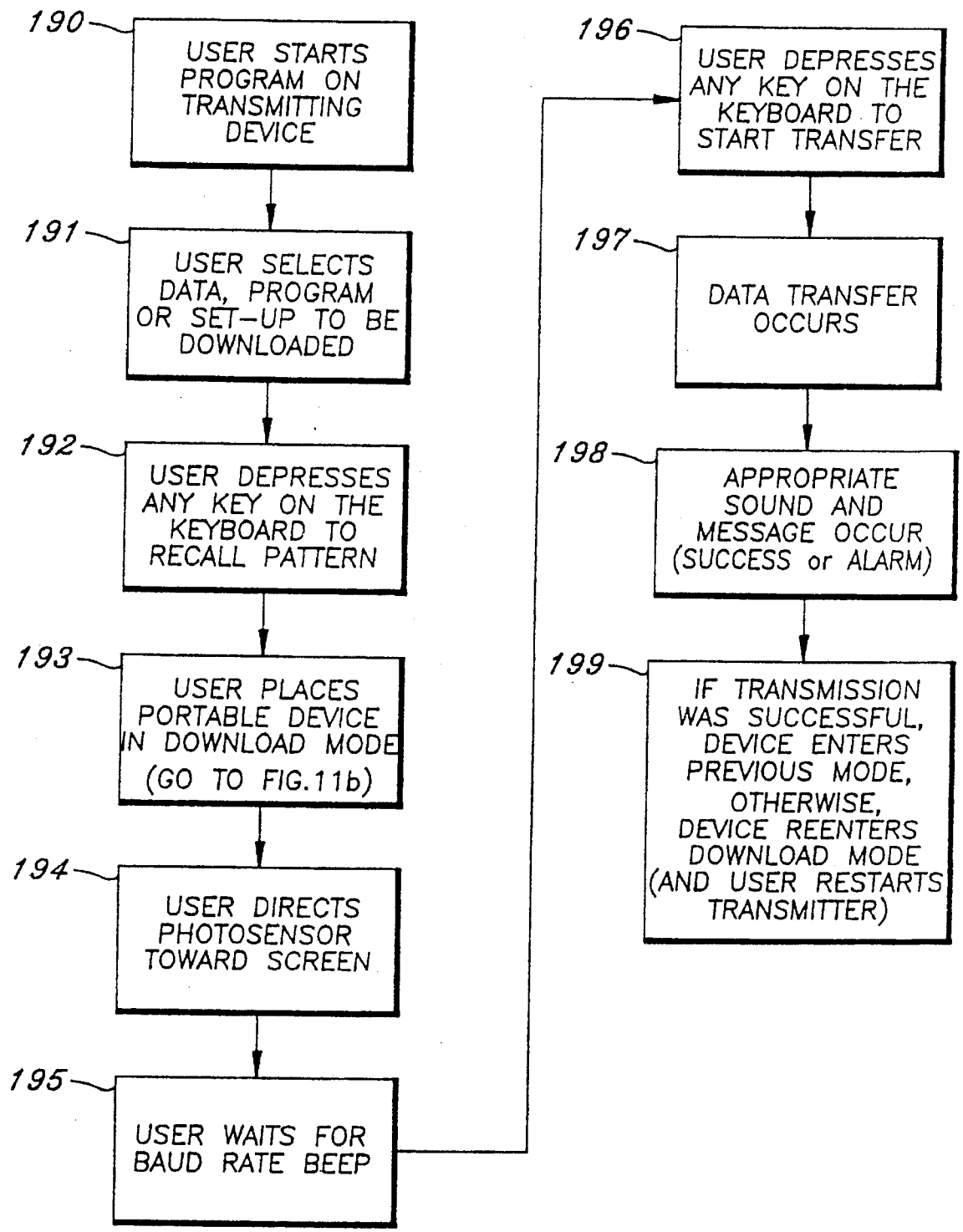
Figure 11B:
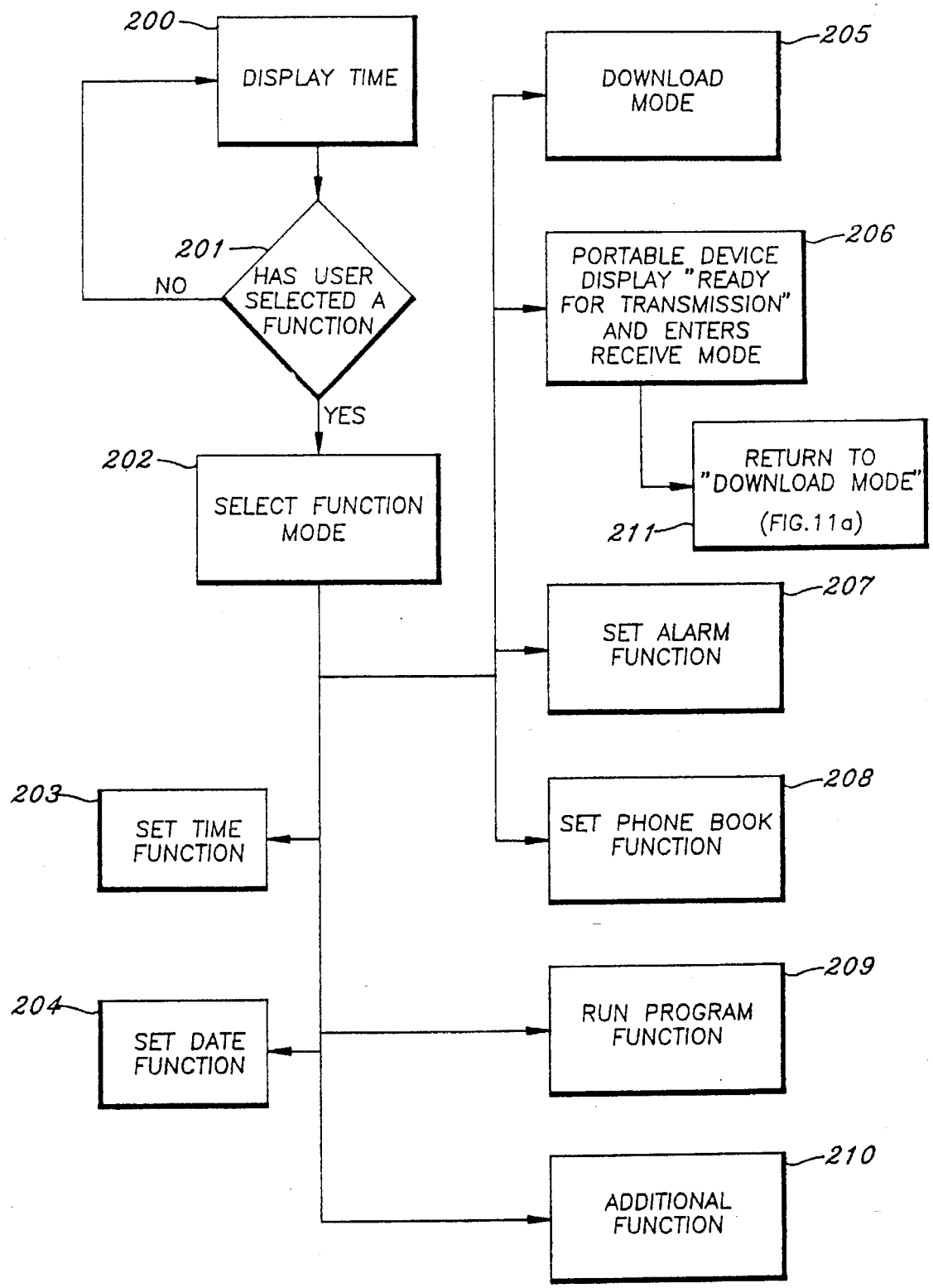
Figure 12:
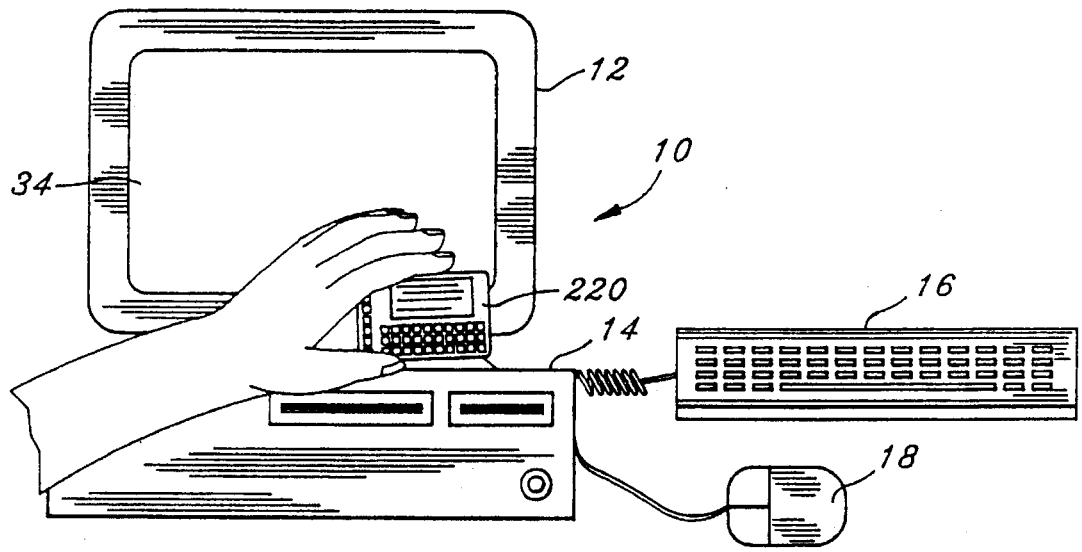

FIGS. 11*a* and 11*b* are flow depicting the operation, including user inputs, of a typical transfer of data to a multifunction electronic wristwatch 20. The user starts by initiating the transmitting program on the transmitting device (step 190). The user next selects the information to be downloaded (e.g., data, programs, configuration information) (step 191). This is followed by depressing a key on keyboard 16 or using a mouse 18 to recall the data transfer pattern (which can be adjusted by user inputs) (step 192). Now, device 20 must be placed in download mode (step 193). Before being placed in download mode (or any other function), device 20 continuously displays the time (step 200). A check 201 is repeatedly made to determine whether the user has selected a function. Once a function is selected, device 20 sets a flag to signify the chosen function (step 202). In addition to download mode 205, various other functions can be selected on a typical portable device, such as: set time 203, set date 204, set alarm 207, set phone book 208, run program 209, and similar additional functions 210. Once download mode 205 has been selected, device 20 displays "Ready for Transmission" and begins awaiting data transmission (step 206). Return block 211 denotes completion of selecting download mode and a return to the normal operating sequence.

After selecting download mode, the user manipulates the wristwatch sensor 26 to face CRT screen 34 (step 194). As previously described, computer 14 may provide the user with the capability to adjust the size and position of the data transfer pattern on display 34 to the most convenient position. By applying the procedure described hereinabove, device 20 determines when the baud rate is matched and completes the procedure, concluding with an audible beep to inform the user of a valid signal (step 195).

Once the above is complete, the user depresses a key on keyboard 16 to initiate data transfer (step 196). After a key is depressed, data transfer occurs (step 197). Once the end message has been received and the transmissions checks have been made (e.g., model number and checksum verification), the appropriate audible and visual signals are given (step 198). Finally, if the transmission was successful, device 20 returns to the mode it was in before download mode 205 was selected. Otherwise, device 20 reenters download mode and the data transfer is reattempted.

The procedure as described above is very well suited for transferring data to an electronic multifunction wristwatch which has no keyboard, because of the difficulty of inputting data into the watch using pushbuttons or similar methods which are slow and time consuming. However, the system is also applicable and useful with various types of hand held devices having elementary or rudimentary keyboard input capability, such as credit card or hand held data bank type devices. Also, the system is suitable for relatively high data transfer baud rate as high as 9600 baud when using high resolution CRT monitors with low persistence phosphors and utilizing the entire screen for the data transfer pattern.

Figure 13:
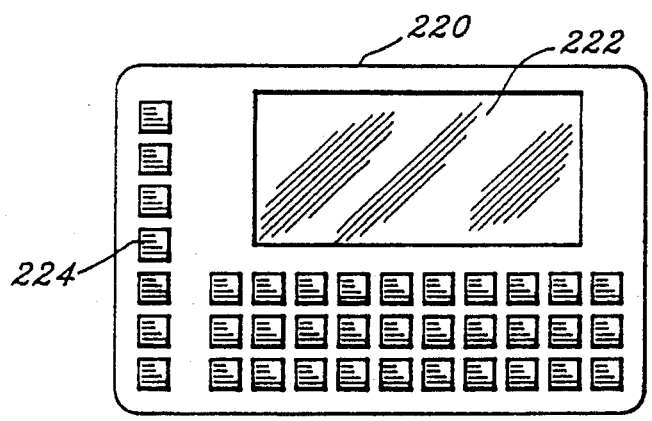
Figure 14:
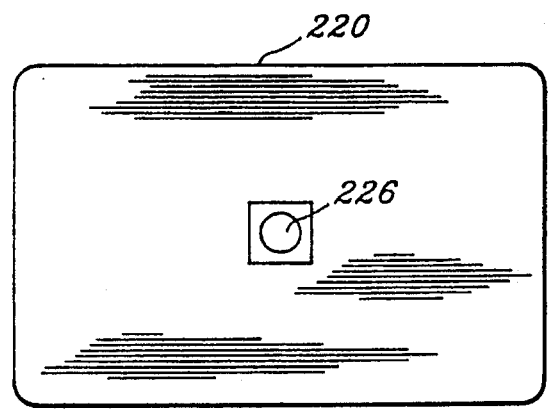

Referring to FIGS. 12 through 15 of the drawings, the same type of data transmitter is shown as illustrated in FIG. 1. However, the portable information device is a hand held telephone menu and appointment scheduling device 220. It could also be any type of Personal Digital Assistant (PDA). Reference to the enlarged views of FIGS. 13 and 14 shows that device 220 includes a dot matrix LCD display 222 and keyboard keys 224 on its front side, while on the back side it carries a photosensor 226. Information device has a relatively flat rectangular shape so that it may be carried in a coat pocket or purse. By locating photosensor 226 on the back, the portable information device 220 may be manipulated so that photosensor 226 faces the CRT screen 34, while the user can operate the keys 224 and view the display 222 facing the operator.

In accordance with the present invention, an initial use of a particular portable information device (or "platform") with a particular CRT monitor, or use of the same portable information device with a new monitor or new PC will require calibration so as to synchronize data transfer rate from the CRT to the portable information device. Thereafter, it is merely necessary to confirm the proper baud rate of transmission as indicated in block 111 of FIG. 9, and as indicated at the start of downloading by the steps 194 and 195 in the interface flow chart shown in FIG. 11a.

The following FIGS. 15–19 illustrate the method and apparatus for synchronizing data transfer in accordance with the present invention. The invention is illustrated both by the manual calibration procedure depicted in FIG. 18 and the automatic calibration procedure depicted in FIG. 19.

Figure 15:
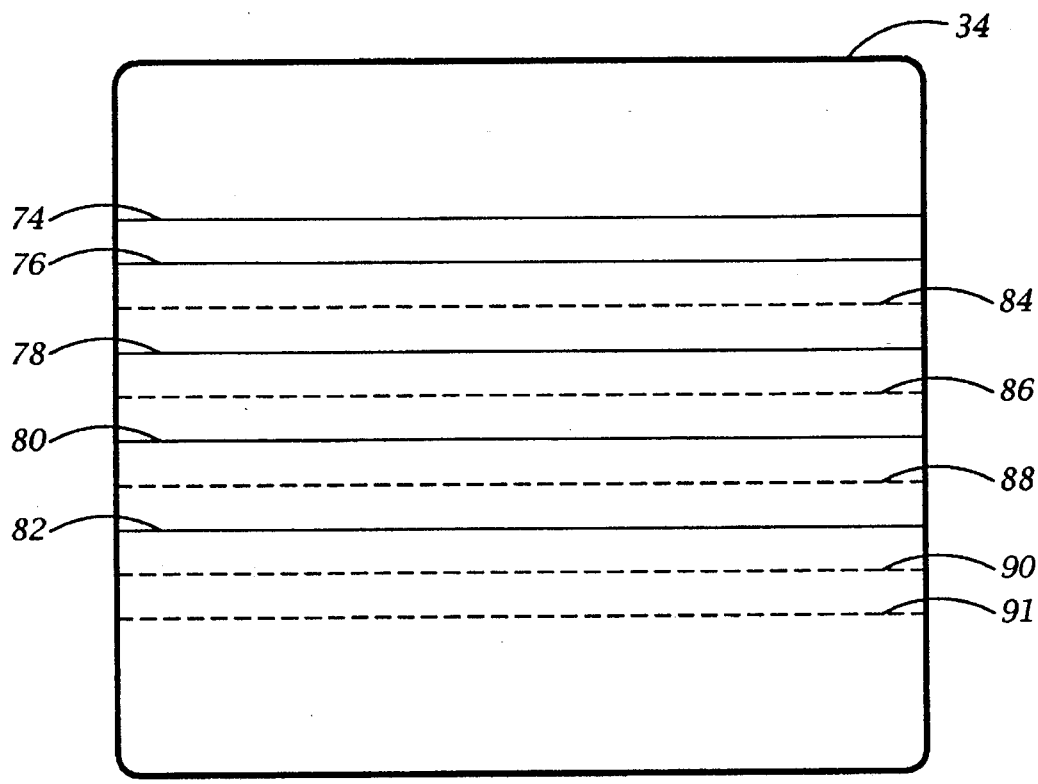

Referring first to FIG. 15 of the drawing, the CRT screen 34 is shown displaying a calibration pattern with the start bit shown at 74, and eight data bits, four of which are represented by visible horizontal lines 76, 78, 80, 82 on the CRT (solid lines), and four of which are represented by the absence of visible horizontal lines on the CRT, shown by dashed lines 84, 86, 88, 90. Lastly, at the end of the eight data bits is a stop bit 91. Each of the lines 74–91 occupies a full horizontal sweep of the raster, when used for the calibration of the data transmission baud rate. However, shorter line segments similar to those in FIG. 3 could also be used. Lines 74–91 are uniformly spaced and each is separated by a space interval of several horizontal raster sweep lines representing a time interval between the start of transmission of each successive data line. The number of successive raster sweep lines in the interval, including flyback time between adjacent raster sweep lines on the CRT determines the pulse repetition rate (or baud rate) at which data is being transmitted. Whether the light pulse is comprised of a full line as shown in FIG. 15, or a partial line segment, as shown in FIG. 3 for example, affects the length "P" of the light pulse, but does not affect the pulse repetition rate.

Figure 16:
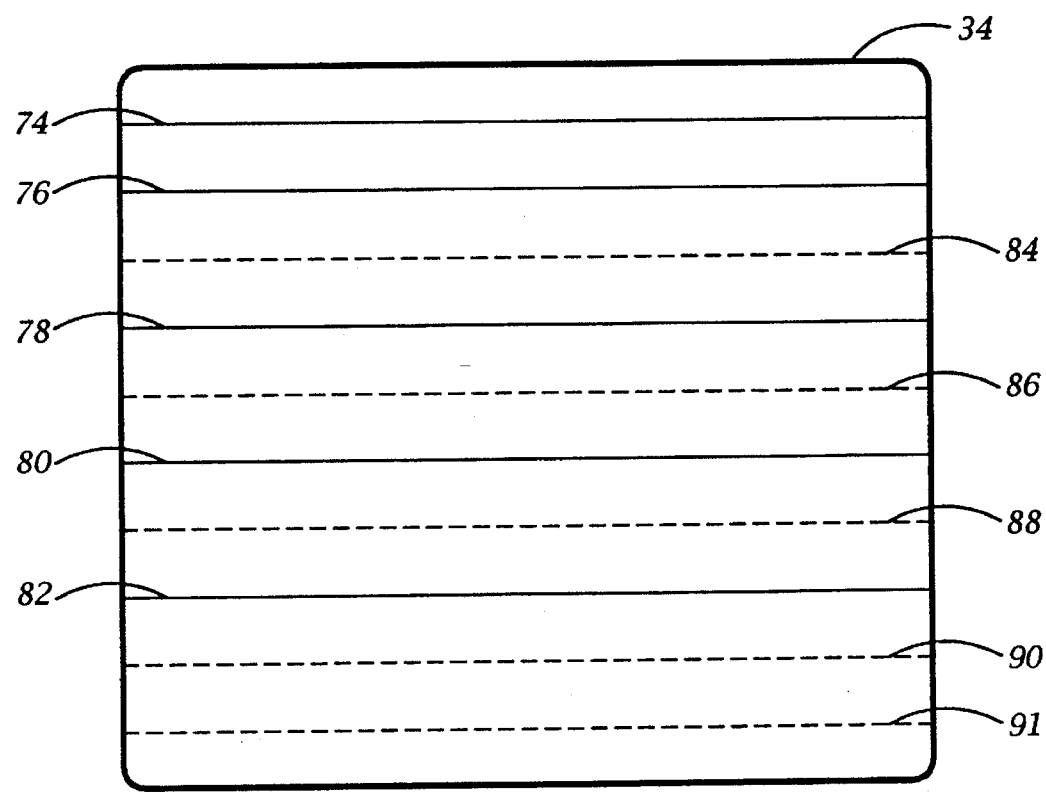

Reference to FIG. 16 of the drawing illustrates the same pattern as shown in FIG. 15, but with a larger space interval due to a greater number of raster sweep lines between successive data lines. In FIG. 16, there is a greater length of time between light pulses and hence a lower pulse repetition rate or baud rate of data transmission.

Figure 17:
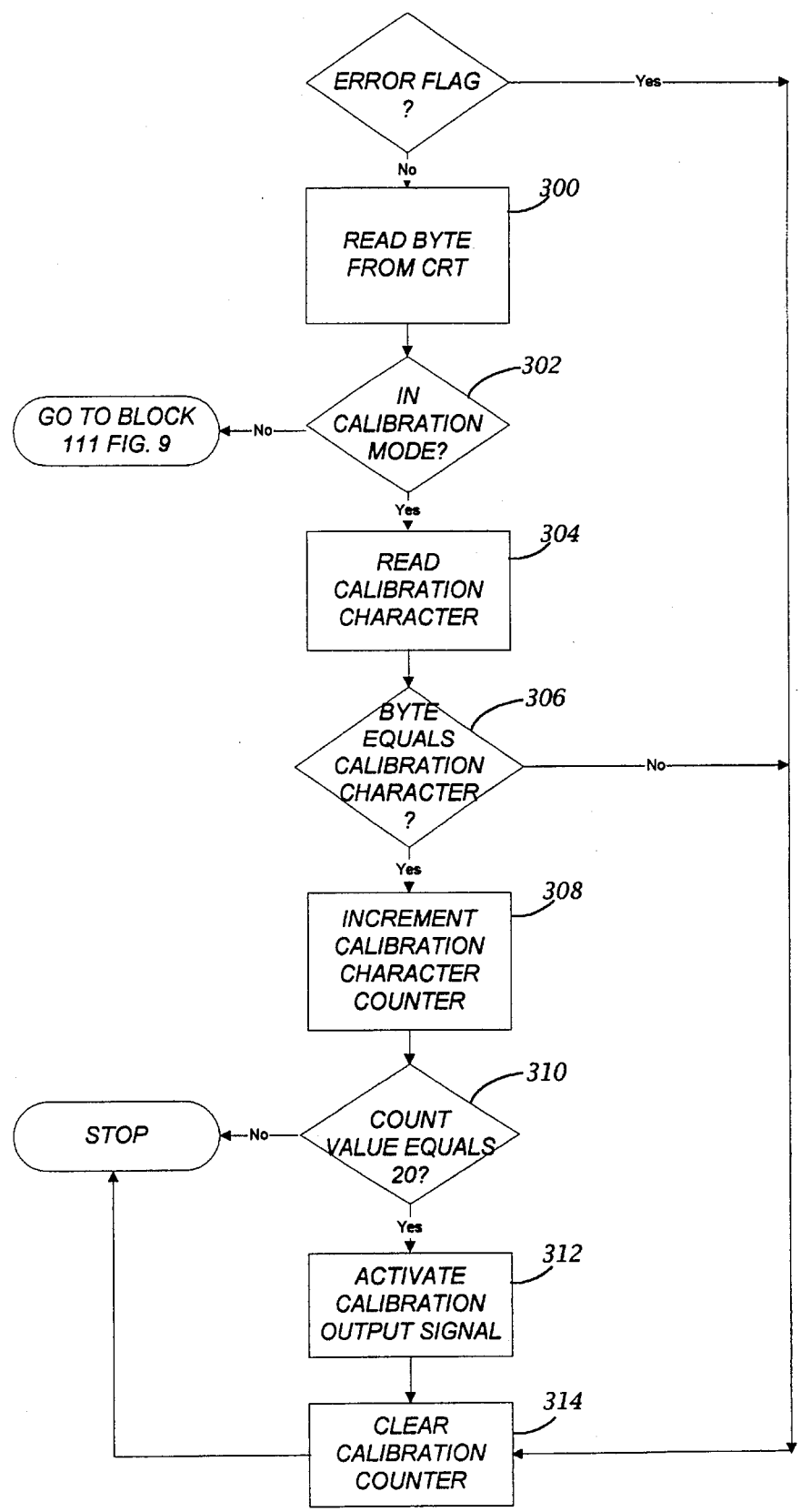

A flow chart illustrating the program in the portable information device is shown in FIG. 17. The flow chart represents a calibration program existing as firmware in ROM 104 of the portable information device 20, in this case a wristwatch utilizing the aforementioned Motorola microcontroller. Upon receipt of a signal that a byte or block of data is available from the CRT (see FIG. 8, block 72), the byte is read at block 300. In the event of a mismatch between pulse repetition rate of the transmitted calibration character and the fixed pulse reception rate of the watch, the byte received will likely not correspond to the byte transmitted.

After testing at 302 to see if the watch is in calibration mode, the CPU 101 of the watch reads a preselected stored calibration character, comprising a block of coded bits stored in the watch ROM 104. Any suitable calibration character may be used, as long as it is preselected to be the same as the calibration pattern to be transmitted by the CRT. The character selected in the present case is a hexidecimal "55" expressed in binary as 0 1 0 1 0 1 0 1. A comparison is made at 306 to determine if the byte "as received" matches the calibration character stored in the watch ROM 104. A correct match means that the data transmission pulse repetition rate may be received at the pulse reception rate of the watch.

In order to give greater assurance, the watch is programmed to provide a counter and a selectable count value is stored in the watch RAM 103 to which the count number of matches is compared. The counter is incremented at 308, compared at 310 to the selected count value, which in this case equals 20. 20 correct matches of the stored calibration character with the transmitted calibration pattern is a number which is empirically determined, which signifies the likelihood of error free transmission at the current baud rate. When the character has been successfully compared so as to result in the preselected number of matches of the received data bits with the stored calibration character in the counter, a calibration output signal is activated at 312, and the calibration counter is cleared at 314. The calibration output signal may be a "beep" resulting from a pulse sent to the audible watch alarm driver or it may consist of a special message displayed on the watch LCD display. Each time there are 20 matches, the watch beeps; a steady series of beeps indicates that data transmission can take place.

While the preferred embodiment requires a preselected number of successive comparisons or matches between transmittal and received calibration characters, theoretically one successful match is all that is needed to confirm that the transmission can begin, in which case the calibration character counter might be omitted.

Figure 18:
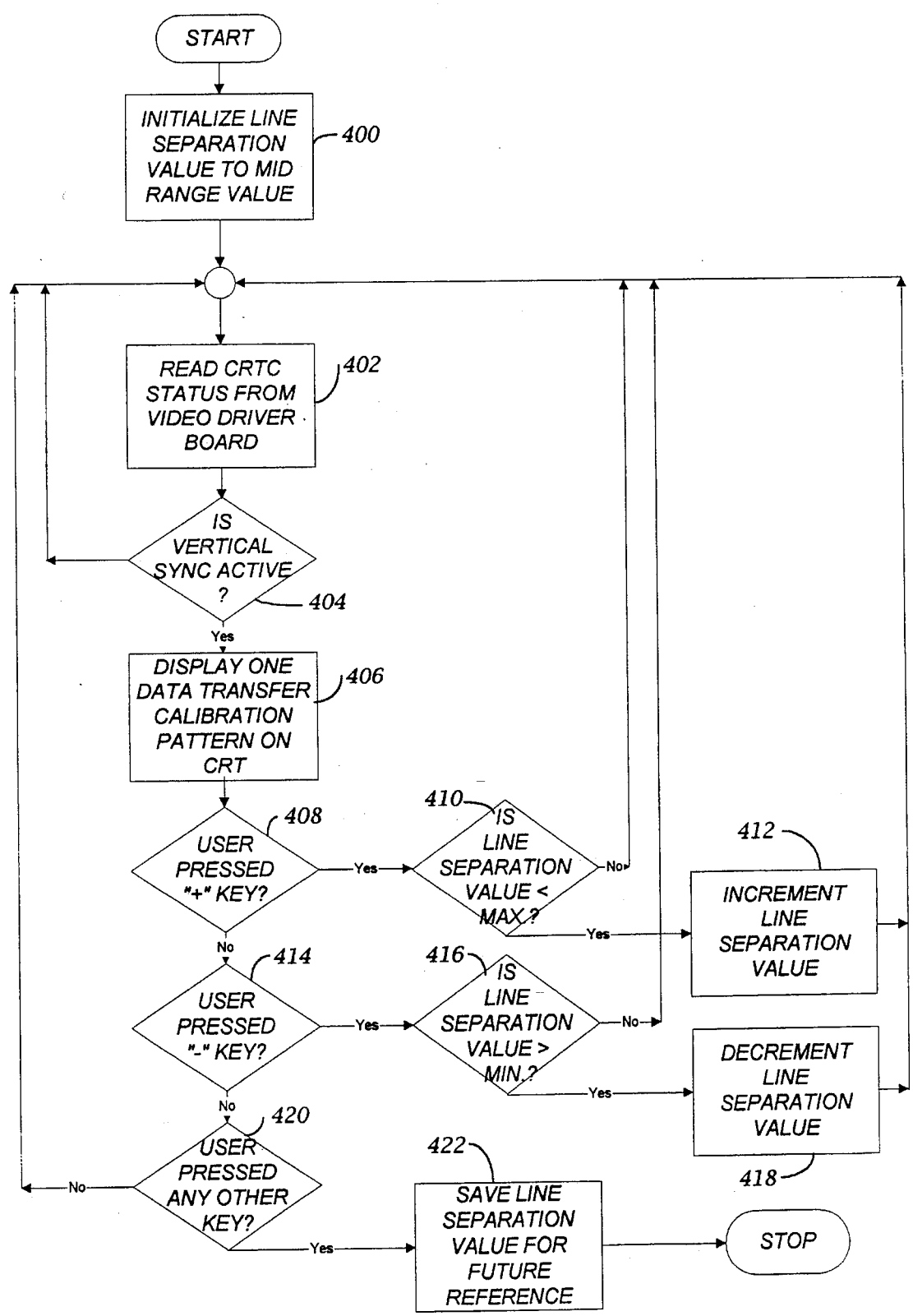

FIG. 18 illustrates a manual calibration procedure used to select the proper pulse repetition rate for data transmission to the portable information device 20 or 220, so that data may be transmitted at the correct baud rate without error. The flow diagram for manually adjusting the pulse repetition rate illustrated in FIG. 18, provides for an operator to observe a transfer calibration pattern on the CRT screen 34 and to increase or decrease the pulse repetition rate by manually actuating selected keys on the computer keyboard 16, resulting in decreasing or increasing the number of raster lines separating the visible lines respectively as indicated in FIGS. 15 and 16, until receiving a signal on the calibration output signal means. In the preferred embodiment, the calibration output signal is an audible "beep" from the portable information device 20 or 220.

FIG. 18 may be carried out by a "manual calibration" computer program stored in the personal computer 14 which utilizes the CRT as a video display. In FIG. 18, the pattern displayed on the CRT is initialized, corresponding to a mid-range value of pulse repetition rates, as indicated in block 400. The CRTC status register is read at 402 and, if the vertical sync is active as determined at 404, a data transfer calibration pattern, as in FIG. 15 or 16 is displayed on the screen 34 as shown in block 406. The displayed calibration pattern which is selected for display must correspond to the calibration character stored in the portable information device 20 or 220. The selected data transfer calibration pattern is a hexadecimal 55, represented by binary code 0 1 0 1 0 1 0 1. When the start bit and stop bit are included, the total binary signal is 1 0 1 0 1 0 1 0 1 0, with the 1's corresponding to the solid visible (illuminated) lines 74–82 in FIGS. 15 and 16.

The manual calibration computer program is arranged to store selected line separation values, as well as values representing maximum and minimum spacing (corresponding to a minimum pulse repetition rate and a maximum pulse repetition rate, respectively), and to increment or decrement one raster line at a time. Incrementing proceeds manually by testing for a keyboard "+" key depression at 408, in comparison to the maximum value at 410 and incrementing at 412 if the value is within range. Similarly, the "–" key depression is read at 414, comparison to minimum separation value made at 416, and decrementing by one raster line at 418 if the value is within range, as shown on the flow chart. After checking for other keys, at 420, the current value is stored at 422.

Figure 19:
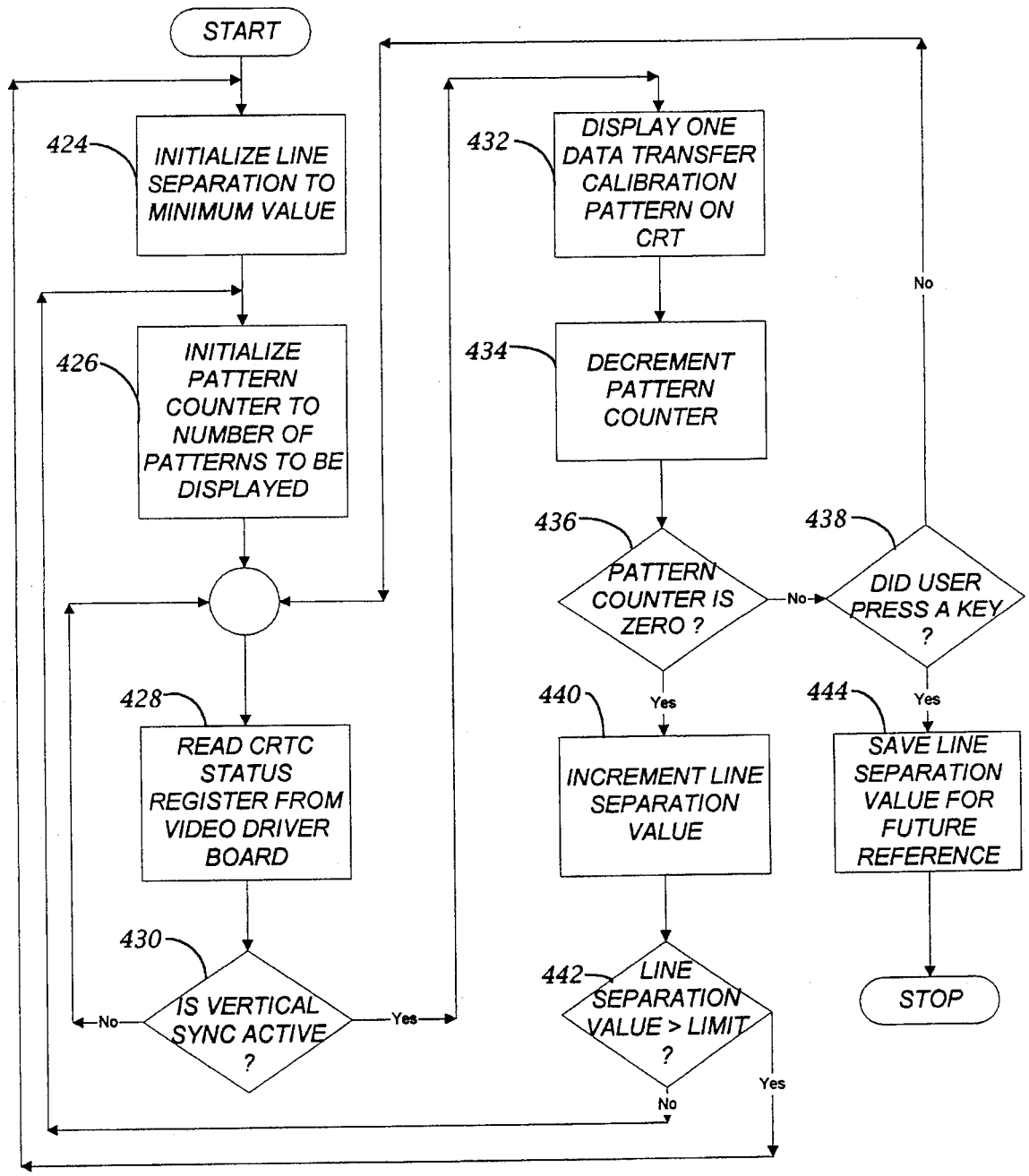

An automatic calibration procedure is shown in FIG. 19, which may be carried out by an "automatic calibration" program stored in the computer 14. This program is arranged to gradually increment the line separation value (decrease the pulse repetition rate in steps) until the procedure is stopped by the operator pressing a keyboard 16 key. The line separation value is initialized to the minimum value (highest selectable pulse repetition rate) at 424 and a pattern counter is initialized for display of a preselected number of calibration patterns at the initial line separation value at 426. The number of calibration patterns selected depends on how long a particular pattern "appears" to remain the same on the CRT, since the pattern is repeated every time the screen is refreshed at the vertical scan rate. After reading the CRTC status register and determining if the vertical sync is active at 428 and 430, respectively, one transfer calibration pattern is displayed at 432, the counter decremented at 434 and, compared to zero at 436. Unless the user presses a keyboard 16 key at 438, the aligned separation value is incremented at 440, compared with the maximum line separation value (minimum pulse repetition rate) at 442, and the procedure repeated. Unless the user presses a key upon hearing the watch "beep", this will be observed as a series of gradually expanding line patterns on the CRT screen 34. If a key is not pressed, the maximum line separation value is reached, and the minimum line separation value is reestablished (step 424) so that the expanding patterns are repeated over and over. If a key is pressed, the line separation value is no longer incremented and the current line separation value is stored as indicated at 444.

OPERATION OF THE INVENTION

The operation of the synchronization or calibration process will be apparent from the following summary. The portable information device 20 or 220 is placed in calibration mode and manipulated in front of the CRT screen 34. If the manual calibration mode is selected, the data calibration pattern appears on the computer monitor screen 34 and the pattern adjusted by pressing the "+" or "–" keys until a "beep" is heard on the portable information device 20 or 220. This signifies that the calibration pattern appearing on the screen 34 has been successfully compared and matched with the calibration character in the portable information device 20 or 220 for 20 successive matches, indicating that substantially error free data transmission is now possible. Of course, fewer than 20 matches may be selected or even a single match in some cases.

The operation of automatic calibration as described in FIG. 19 is similar. After placing the portable information device 20 or 220 in calibration mode and selecting automatic calibration procedure, the portable information device 20 or 220 is held in front of the screen 34 while the selectable pulse repetition rate is periodically and repetitively changed. At any point when a "beep" is heard, signifying 20 successive matches, the operator presses a key to stop the procedure.

Thus there has been disclosed an improved arrangement for synchronizing data transfer rate to a wrist instrument or hand held device from a controllable light source, including a CRT such as found in a computer monitor. The invention permits the selection of pulse repetition rate of the controllable light source so that it is receivable at the fixed pulse reception rate receivable by the portable information device. Other modifications will occur to those skilled in the art, and it is desired to secure in the appended claims all such modifications as fall within the true spirit and scope of the invention.

We claim:

1. A method for synchronizing the data transfer rate for downloading data from a cathode ray tube (CRT) adapted for transmission of serial data bits as light pulses appearing as spaced lines on the CRT at a selectable pulse repetition rate to a portable information device having a photosensor responsive to said light pulses with means adapted to receive and store binary coded data corresponding to said light pulses at least one fixed pulse reception rate comprising:

(a) providing calibration output signal means in said portable information device, (b) storing a calibration character comprising a block of binary coded data in said portable information device, (c) transmitting a block of serial data bits corresponding to said calibration character in the form of light pulses appearing as spaced lines on the CRT, (d) receiving said block of serial data bits via said photosensor on said portable information device, (e) comparing said received serial data bits with said stored calibration character, (f) activating said calibration output signal means after receiving at least one match of the received data bits with the stored calibration character, and (g) selecting a new pulse repetition rate by changing the line spacing of said spaced lines corresponding to said calibration character on the CRT and repeating steps (c) through (e) in the absence of a signal from said calibration output signal means, until said new repetition rate of the CRT data transmission may be received at the fixed pulse reception rate of the portable information device.

2. The method according to claim 1, including the additional steps of:

providing counter means in said portable information device, storing a count value in said portable information device, and activating said calibration output signal means in step (f) after a number of successive matches corresponding to said count value.

3. The method according to claim 1, including the additional steps of:

providing a manual calibration program for changing the line spacing appearing on said CRT so as to select a new pulse repetition rate, and providing manual key input means for selectively incrementing or decrementing said line spacing.

4. The method according to claim 1, including the additional steps of:

providing an automatic calibration program for periodically and automatically changing the line spacing appearing on said CRT so as to change the selectable pulse repetition rate of step (g) successively to said new pulse repetition rate, and providing manual key input means for halting step (g) upon receiving a signal from said calibration output signal means.

5. Apparatus for synchronizing the data transfer rate for downloading data, comprising:

a cathode ray tube (CRT) with means adapted to transmit serial data bits as light pulses appearing as spaced lines on the CRT at a selectable pulse repetition rate, a portable information device having a photosensor responsive to said light pulses with means adapted to receive and store binary coded data corresponding to said light pulses at least one fixed pulse reception rate, calibration output signal means in said personal information device, means for storing a calibration character comprising a block of binary coded data in said personal information device, means for transmitting a block serial data bits corresponding to said calibration character in the form of light pulses appearing as spaced lines on the CRT, means in said person information device for receiving said block of serial data bits, means for comparing said received serial data bits with said stored calibration character, means for activating said calibration output signal means after receiving at least one match of the received data bits with the stored calibration character, and means for selecting a new pulse repetition rate by changing the line spacing of said spaced lines corresponding to said calibration character on the CRT in the absence of a signal from said calibration output signal means, until said new pulse repetition rate of the CRT data transmission may be received at the fixed pulse reception rate of the portable information device.

6. The apparatus according to claim 5 and further including:

counter means in said personal information device, means for storing a count value in said personal information device, and means activating said calibration output signal means after receiving a number of successive matches equal to said count value.

7. The apparatus according to claim 5, and further including:

automatic calibration program means for periodically and automatically changing said selectable pulse repetition rate to a new pulse repetition rate, and manual key means adapted to disable said automatic calibration program means.

8. The apparatus according to claim 5, and further including:

manual calibration program means adapted to change said selectable pulse repetition rate to a new pulse repetition rate, and manual key input means arranged to operate said manual calibration program, so as to increment or decrement the selectable pulse repetition rate.

9. The apparatus according to claim 5, wherein said portable information device is a multifunction electronic wristwatch.

10. The apparatus according to claim 5, wherein said portable information device is a hand held telephone menu scheduling device.

11. The apparatus according to claim 5, wherein said portable information device is a hand held appointment scheduling device.

* * * * *